US010963524B2

(12) United States Patent
Smith et al.

(10) Patent No.: US 10,963,524 B2
(45) Date of Patent: *Mar. 30, 2021

(54) SELF POPULATING ADDRESS BOOK

(71) Applicant: VERIZON MEDIA INC., New York, NY (US)

(72) Inventors: Adam Smith, San Francisco, CA (US); Jeffrey Bonforte, San Francisco, CA (US)

(73) Assignee: VERIZON MEDIA INC., New York, NY (US)

( * ) Notice: Subject to any disclaimer, the term of this patent is extended or adjusted under 35 U.S.C. 154(b) by 430 days.

This patent is subject to a terminal disclaimer.

(21) Appl. No.: 15/013,281

(22) Filed: Feb. 2, 2016

(65) Prior Publication Data

US 2016/0147899 A1    May 26, 2016

Related U.S. Application Data

(63) Continuation of application No. 14/084,491, filed on Nov. 19, 2013, now Pat. No. 9,275,126, which is a
(Continued)

(51) Int. Cl.
*G06F 16/00*    (2019.01)
*G06Q 50/00*    (2012.01)
(Continued)

(52) U.S. Cl.
CPC ...... *G06F 16/9535* (2019.01); *G06F 16/2379* (2019.01); *G06F 16/24578* (2019.01);
(Continued)

(58) Field of Classification Search
CPC .. G06Q 30/0269; G06Q 10/109; G06Q 50/30; G06Q 50/01; G06Q 30/0256;
(Continued)

(56) References Cited

U.S. PATENT DOCUMENTS 5,396,647 A    3/1995  Thompson et al.
5,610,915 A    3/1997  Elliott et al.
(Continued)

FOREIGN PATENT DOCUMENTS

| CN | 101351818 | 1/2009 |
|----|-----------|--------|
| EP | 0944002   | 9/1999 |

(Continued)

OTHER PUBLICATIONS

"OpenSocial Specification v0.9", OpenSocial and Gadgets Specification Group, Apr. 2009.
(Continued)

*Primary Examiner* — Srirama Channavajjala
(74) *Attorney, Agent, or Firm* — James J. De Carlo; Greenberg Traurig, LLP

(57) ABSTRACT

System, methods and computer program products for creating and maintaining an address book are described. The address book may collect or update its existing contact information from sent or received communications. Contact information associated with the existing contacts also may be collected (or updated based on information received) from outside sources (e.g., external to an application hosting or accessing the address book). The address book may intelligently combine profile data from various sources to enrich the existing records associated with the contacts.

17 Claims, 11 Drawing Sheets

Related U.S. Application Data continuation of application No. 12/792,698, filed on Jun. 2, 2010, now Pat. No. 8,661,002, which is a continuation of application No. PCT/US2010/035405, filed on May 19, 2010.

(60) Provisional application No. 61/183,315, filed on Jun. 2, 2009.

(51) Int. Cl.

| | | |
|---|---|---|
| *G06F 16/9535* | (2019.01) | |
| *G06F 16/27* | (2019.01) | |
| *G06F 16/951* | (2019.01) | |
| *G06F 16/23* | (2019.01) | |
| *G06F 16/2457* | (2019.01) | |
| *G06Q 10/10* | (2012.01) | |
| *G06F 16/338* | (2019.01) | |
| *G06F 16/9536* | (2019.01) | |
| *G06F 16/9538* | (2019.01) | |
| *G06Q 30/02* | (2012.01) | |
| *H04L 29/08* | (2006.01) | |

(52) U.S. Cl.
CPC .......... *G06F 16/275* (2019.01); *G06F 16/338* (2019.01); *G06F 16/951* (2019.01); *G06F 16/9536* (2019.01); *G06F 16/9538* (2019.01); *G06Q 10/107* (2013.01); *G06Q 30/0269* (2013.01); *G06Q 50/01* (2013.01); *H04L 29/08936* (2013.01); *H04L 67/306* (2013.01)

(58) Field of Classification Search
CPC ......... G06F 17/30389; G06F 17/30864; G06F 17/30867; G06F 17/30675; G06F 17/30522; G06F 17/3053; G06F 16/9535; G06F 16/3331; G06F 16/3332; G06F 16/335; G06F 16/58; G06F 16/5846; G06F 16/637; G06F 16/735; G06F 16/9536; G06F 16/9538; G06F 16/338; G06F 16/275; G06F 16/951; G06F 16/2379; G06F 16/24578; H04L 67/306; H04L 29/08936

See application file for complete search history.

(56) References Cited

U.S. PATENT DOCUMENTS

| | | | |
|---|---|---|---|
| 5,966,714 | A | 10/1999 | Huang et al. |
| 6,020,884 | A | 2/2000 | MacNaughton et al. |
| 6,154,205 | A | 11/2000 | Carroll et al. |
| 6,285,999 | B1 | 9/2001 | Page |
| 6,385,644 | B1 | 5/2002 | Devine et al. |
| 6,405,197 | B2 | 6/2002 | Gilmour |
| 6,484,196 | B1 | 11/2002 | Maurille |
| 6,510,453 | B1 | 1/2003 | Apfel et al. |
| 6,546,393 | B1 | 4/2003 | Khan |
| 6,560,620 | B1 | 5/2003 | Ching |
| 6,594,654 | B1 | 7/2003 | Salam et al. |
| 6,615,348 | B1 | 9/2003 | Gibbs |
| 6,714,967 | B1 | 3/2004 | Horvitz |
| 6,721,748 | B1 | 4/2004 | Knight et al. |
| 6,832,245 | B1 | 12/2004 | Isaacs et al. |
| 6,836,799 | B1* | 12/2004 | Philyaw ................ G06Q 30/02 709/224 |
| 6,931,419 | B1 | 8/2005 | Lindquist |
| 6,952,805 | B1* | 10/2005 | Tafoya ................. G06Q 10/107 709/206 |
| 6,965,918 | B1 | 11/2005 | Arnold et al. |
| 6,996,777 | B2 | 2/2006 | Hiipakka |
| 7,003,724 | B2 | 2/2006 | Newman |
| 7,058,892 | B1 | 6/2006 | MacNaughton et al. |
| 7,076,533 | B1 | 7/2006 | Knox et al. |
| 7,085,745 | B2 | 8/2006 | Klug |
| 7,103,806 | B1 | 9/2006 | Horvitz |
| 7,181,518 | B1 | 2/2007 | Matsumoto et al. |
| 7,185,065 | B1 | 2/2007 | Holtzman et al. |
| 7,187,932 | B1* | 3/2007 | Barchi .................. H04L 12/14 379/201.01 |
| 7,237,009 | B1 | 6/2007 | Fung et al. |
| 7,246,045 | B1 | 7/2007 | Rappaport et al. |
| 7,272,637 | B1* | 9/2007 | Himmelstein .... G06F 17/30389 707/999.01 |
| 7,289,614 | B1 | 10/2007 | Twerdahl et al. |
| 7,328,242 | B1 | 2/2008 | McCarthy et al. |
| 7,333,976 | B1 | 2/2008 | Auerbach et al. |
| 7,359,894 | B1 | 4/2008 | Liebman et al. |
| 7,383,307 | B2 | 6/2008 | Kirkland et al. |
| 7,424,541 | B2* | 9/2008 | Bourne ................. H04L 51/32 455/414.1 |
| 7,444,323 | B2 | 10/2008 | Martinez et al. |
| 7,454,464 | B2 | 11/2008 | Puthenkulam et al. |
| 7,475,109 | B1 | 1/2009 | Fletcher et al. |
| 7,475,113 | B2 | 1/2009 | Stolze |
| 7,512,788 | B2 | 3/2009 | Choi et al. |
| 7,512,814 | B2 | 3/2009 | Chen et al. |
| 7,536,384 | B2 | 5/2009 | Venkataraman et al. |
| 7,539,676 | B2 | 5/2009 | Aravamudan et al. |
| 7,580,363 | B2 | 8/2009 | Sorvari et al. |
| 7,593,995 | B1 | 9/2009 | He et al. |
| 7,606,860 | B2 | 10/2009 | Puthenkulam et al. |
| 7,620,407 | B1 | 11/2009 | Donald et al. |
| 7,624,103 | B2 | 11/2009 | Wiegering et al. |
| 7,627,598 | B1 | 12/2009 | Burke |
| 7,634,463 | B1 | 12/2009 | Katragadda et al. |
| 7,639,157 | B1 | 12/2009 | Whitley et al. |
| 7,653,695 | B2 | 1/2010 | Flury et al. |
| 7,685,144 | B1 | 3/2010 | Katragadda |
| 7,692,653 | B1 | 4/2010 | Petro et al. |
| 7,698,140 | B2 | 4/2010 | Bhardwaj et al. |
| 7,702,730 | B2 | 4/2010 | Spataro et al. |
| 7,707,249 | B2 | 4/2010 | Spataro et al. |
| 7,707,509 | B2 | 4/2010 | Naono et al. |
| 7,716,140 | B1 | 5/2010 | Nielsen et al. |
| 7,720,916 | B2 | 5/2010 | Fisher et al. |
| 7,724,878 | B2 | 5/2010 | Timmins et al. |
| 7,725,492 | B2 | 5/2010 | Sittig et al. |
| 7,730,010 | B2 | 6/2010 | Kishore et al. |
| 7,743,051 | B1 | 6/2010 | Kashyap et al. |
| 7,752,081 | B2 | 7/2010 | Calabria |
| 7,756,895 | B1 | 7/2010 | Emigh |
| 7,756,935 | B2 | 7/2010 | Gaucas |
| 7,761,436 | B2 | 7/2010 | Norton et al. |
| 7,788,260 | B2 | 8/2010 | Lunt et al. |
| 7,805,492 | B1 | 9/2010 | Thatcher et al. |
| 7,818,396 | B2 | 10/2010 | Dolin et al. |
| 7,827,208 | B2 | 11/2010 | Bosworth et al. |
| 7,827,265 | B2 | 11/2010 | Cheever et al. |
| 7,831,676 | B1 | 11/2010 | Nagar |
| 7,831,692 | B2 | 11/2010 | French et al. |
| 7,836,045 | B2 | 11/2010 | Schachter |
| 7,836,132 | B2 | 11/2010 | Qureshi et al. |
| 7,836,134 | B2 | 11/2010 | Pantalone |
| 7,849,141 | B1 | 12/2010 | Bellegarda et al. |
| 7,849,142 | B2 | 12/2010 | Clegg et al. |
| 7,853,602 | B2 | 12/2010 | Gorti et al. |
| 7,853,881 | B1 | 12/2010 | Aly Assal et al. |
| 7,865,562 | B2 | 1/2011 | Nesbitt et al. |
| 7,870,197 | B2 | 1/2011 | Lewis et al. |
| 7,899,806 | B2 | 3/2011 | Aravamudan et al. |
| 7,899,871 | B1 | 3/2011 | Kumar et al. |
| 7,908,647 | B1 | 3/2011 | Polis et al. |
| 7,925,690 | B2 | 4/2011 | Smith et al. |
| 7,930,430 | B2 | 4/2011 | Thatcher et al. |
| 7,949,611 | B1 | 5/2011 | Nielsen et al. |
| 7,949,627 | B2 | 5/2011 | Aravamudan et al. |
| 7,970,832 | B2 | 6/2011 | Perry, Jr. et al. |
| 7,979,569 | B2 | 7/2011 | Eisner et al. |
| 7,991,764 | B2 | 8/2011 | Rathod |
| 7,996,456 | B2 | 8/2011 | Gross |
| 8,005,806 | B2 | 8/2011 | Rupp et al. |
| 8,028,032 | B2 | 9/2011 | Laird-McConnell |

(56) References Cited

U.S. PATENT DOCUMENTS

| | | | |
|---|---|---|---|
| 8,055,675 B2 * | 11/2011 | Higgins | G06F 16/3322 |
| | | | 707/769 |
| 8,055,715 B2 | 11/2011 | Bensky et al. | |
| 8,073,928 B2 | 12/2011 | Dolin et al. | |
| 8,086,676 B2 | 12/2011 | Palahnuk et al. | |
| 8,086,968 B2 | 12/2011 | McCaffrey et al. | |
| 8,140,566 B2 | 3/2012 | Boerries et al. | |
| 8,145,791 B2 | 3/2012 | Thatcher et al. | |
| 8,151,358 B1 | 4/2012 | Herold | |
| 8,161,122 B2 | 4/2012 | Sood et al. | |
| 8,200,761 B1 | 6/2012 | Tevanian | |
| 8,200,808 B2 | 6/2012 | Ishida | |
| 8,204,897 B1 | 6/2012 | Djabarov et al. | |
| 8,239,197 B2 | 8/2012 | Webb et al. | |
| 8,244,848 B1 | 8/2012 | Narayanan et al. | |
| 8,284,783 B1 | 10/2012 | Maufer et al. | |
| 8,291,019 B1 | 10/2012 | Rochelle et al. | |
| 8,296,179 B1 | 10/2012 | Rennison | |
| 8,316,315 B2 | 11/2012 | Portnoy et al. | |
| 8,363,803 B2 | 1/2013 | Gupta | |
| 8,365,235 B2 | 1/2013 | Hunt et al. | |
| 8,392,409 B1 | 3/2013 | Kashyap et al. | |
| 8,392,836 B1 | 3/2013 | Bau et al. | |
| 8,412,174 B2 | 4/2013 | Khosravi | |
| 8,423,545 B2 | 4/2013 | Cort et al. | |
| 8,433,762 B1 | 4/2013 | Wald et al. | |
| 8,443,441 B2 | 5/2013 | Stolfo et al. | |
| 8,463,872 B2 | 6/2013 | Pounds et al. | |
| 8,468,168 B2 | 6/2013 | Brezina et al. | |
| 8,495,045 B2 | 7/2013 | Wolf et al. | |
| 8,510,389 B1 | 8/2013 | Gurajada et al. | |
| 8,522,257 B2 | 8/2013 | Rupp et al. | |
| 8,549,412 B2 | 10/2013 | Brezina et al. | |
| 8,600,343 B2 | 12/2013 | Brezina et al. | |
| 8,606,335 B2 | 12/2013 | Ozaki | |
| 8,620,935 B2 | 12/2013 | Rubin et al. | |
| 8,661,002 B2 * | 2/2014 | Smith | G06Q 10/107 |
| | | | 707/614 |
| 8,666,035 B2 | 3/2014 | Timmins et al. | |
| 8,694,633 B2 | 4/2014 | Mansfield et al. | |
| 8,717,933 B2 | 5/2014 | Fisher et al. | |
| 8,726,169 B2 * | 5/2014 | Payne | H04L 51/32 |
| | | | 715/751 |
| 8,745,060 B2 | 6/2014 | Brezina et al. | |
| 8,754,848 B2 | 6/2014 | Holzer et al. | |
| 8,793,625 B2 | 7/2014 | Rhee et al. | |
| 8,819,234 B1 | 8/2014 | Bauer et al. | |
| 8,849,816 B2 | 9/2014 | Burba et al. | |
| 8,850,343 B2 | 9/2014 | Klassen et al. | |
| 8,972,257 B2 | 3/2015 | Bonforte | |
| 8,982,053 B2 | 3/2015 | Holzer et al. | |
| 8,984,074 B2 | 3/2015 | Monaco | |
| 8,990,323 B2 | 3/2015 | Hein et al. | |
| 9,020,938 B2 | 4/2015 | Cort et al. | |
| 9,058,366 B2 | 6/2015 | Brezina et al. | |
| 9,087,323 B2 | 7/2015 | Hein et al. | |
| 9,159,057 B2 | 10/2015 | Monaco | |
| 9,195,753 B1 | 11/2015 | King et al. | |
| 9,275,118 B2 | 3/2016 | Brezina et al. | |
| 9,275,126 B2 * | 3/2016 | Smith | G06Q 10/107 |
| 9,298,783 B2 | 3/2016 | Brezina et al. | |
| 9,501,561 B2 | 11/2016 | Rubin et al. | |
| 9,514,466 B2 | 12/2016 | Jacobson et al. | |
| 9,584,343 B2 * | 2/2017 | Brezina | G06F 16/9535 |
| 9,727,639 B2 * | 8/2017 | Groeneveld | G06F 16/951 |
| 2001/0022792 A1 | 9/2001 | Maeno et al. | |
| 2001/0037407 A1 | 11/2001 | Dragulev et al. | |
| 2001/0049628 A1 | 12/2001 | Icho | |
| 2002/0016818 A1 | 2/2002 | Kirani et al. | |
| 2002/0019764 A1 * | 2/2002 | Mascarenhas | G06Q 30/02 |
| | | | 707/792 |
| 2002/0024536 A1 | 2/2002 | Kahan et al. | |
| 2002/0049751 A1 | 4/2002 | Chen et al. | |
| 2002/0054587 A1 | 5/2002 | Baker et al. | |
| 2002/0059402 A1 | 5/2002 | Belanger | |
| 2002/0059418 A1 | 5/2002 | Bird et al. | |
| 2002/0059425 A1 | 5/2002 | Belfiore et al. | |
| 2002/0073011 A1 | 6/2002 | Brattain et al. | |
| 2002/0073058 A1 | 6/2002 | Kremer et al. | |
| 2002/0076004 A1 | 6/2002 | Brockenbrough et al. | |
| 2002/0078090 A1 | 6/2002 | Hwang et al. | |
| 2002/0087647 A1 | 7/2002 | Quine et al. | |
| 2002/0091777 A1 | 7/2002 | Schwartz | |
| 2002/0103873 A1 * | 8/2002 | Ramanathan | G06Q 10/107 |
| | | | 709/206 |
| 2002/0103879 A1 | 8/2002 | Mondragon | |
| 2002/0107991 A1 | 8/2002 | Maguire et al. | |
| 2002/0116396 A1 | 8/2002 | Somers et al. | |
| 2002/0143871 A1 | 10/2002 | Meyer et al. | |
| 2002/0152216 A1 | 10/2002 | Bouthors | |
| 2002/0163539 A1 | 11/2002 | Srinivasan | |
| 2002/0194502 A1 | 12/2002 | Sheth et al. | |
| 2003/0028525 A1 | 2/2003 | Santos et al. | |
| 2003/0037116 A1 | 2/2003 | Nolan et al. | |
| 2003/0041030 A1 | 2/2003 | Mansfield | |
| 2003/0093483 A1 | 5/2003 | Allen et al. | |
| 2003/0101227 A1 * | 5/2003 | Fink | H04L 67/2804 |
| | | | 709/207 |
| 2003/0114171 A1 | 6/2003 | Miyamoto | |
| 2003/0114956 A1 | 6/2003 | Cullen et al. | |
| 2003/0120608 A1 | 6/2003 | Pereyra | |
| 2003/0131062 A1 | 7/2003 | Miyashita | |
| 2003/0142125 A1 | 7/2003 | Salmimaa et al. | |
| 2003/0167324 A1 | 9/2003 | Farnham et al. | |
| 2003/0204439 A1 | 10/2003 | Cullen, III | |
| 2003/0220835 A1 | 11/2003 | Barnes, Jr. | |
| 2003/0220978 A1 | 11/2003 | Rhodes | |
| 2003/0220989 A1 | 11/2003 | Tsuji et al. | |
| 2003/0233419 A1 | 12/2003 | Beringer | |
| 2004/0002903 A1 | 1/2004 | Stolfo et al. | |
| 2004/0015547 A1 | 1/2004 | Griffin et al. | |
| 2004/0015554 A1 | 1/2004 | Wilson | |
| 2004/0034537 A1 | 2/2004 | Gengarella et al. | |
| 2004/0039630 A1 | 2/2004 | Begole et al. | |
| 2004/0056901 A1 | 3/2004 | March et al. | |
| 2004/0068545 A1 | 4/2004 | Daniell et al. | |
| 2004/0073616 A1 | 4/2004 | Fellenstein et al. | |
| 2004/0078443 A1 | 4/2004 | Malik | |
| 2004/0078444 A1 | 4/2004 | Malik | |
| 2004/0078445 A1 | 4/2004 | Malik | |
| 2004/0100497 A1 | 5/2004 | Quillen et al. | |
| 2004/0122904 A1 | 6/2004 | Kim | |
| 2004/0128355 A1 | 7/2004 | Chao et al. | |
| 2004/0128356 A1 | 7/2004 | Bernstein et al. | |
| 2004/0133561 A1 | 7/2004 | Burke | |
| 2004/0148275 A1 * | 7/2004 | Achlioptas | G06F 16/9535 |
| 2004/0153504 A1 | 8/2004 | Hutchinson et al. | |
| 2004/0162878 A1 | 8/2004 | Lewis et al. | |
| 2004/0174964 A1 | 9/2004 | Koch | |
| 2004/0177048 A1 | 9/2004 | Klug | |
| 2004/0186851 A1 | 9/2004 | Jhingan et al. | |
| 2004/0202117 A1 | 10/2004 | Wilson et al. | |
| 2004/0205002 A1 | 10/2004 | Layton | |
| 2004/0210827 A1 | 10/2004 | Burg et al. | |
| 2004/0215726 A1 | 10/2004 | Arning et al. | |
| 2004/0215734 A1 | 10/2004 | Nagai et al. | |
| 2004/0260756 A1 | 12/2004 | Forstall et al. | |
| 2004/0268229 A1 | 12/2004 | Paoli et al. | |
| 2005/0015432 A1 | 1/2005 | Cohen | |
| 2005/0027779 A1 | 2/2005 | Schinner | |
| 2005/0038687 A1 | 2/2005 | Galdes | |
| 2005/0044152 A1 | 2/2005 | Hardy et al. | |
| 2005/0049896 A1 | 3/2005 | Giunta | |
| 2005/0055409 A1 | 3/2005 | Alsarraf et al. | |
| 2005/0055639 A1 | 3/2005 | Fogg | |
| 2005/0060638 A1 | 3/2005 | Mathew et al. | |
| 2005/0076090 A1 | 4/2005 | Thuerk | |
| 2005/0076221 A1 | 4/2005 | Olkin et al. | |
| 2005/0080868 A1 | 4/2005 | Malik | |
| 2005/0091272 A1 | 4/2005 | Smith et al. | |
| 2005/0091314 A1 | 4/2005 | Blagsvedt et al. | |
| 2005/0091401 A1 | 4/2005 | Keohane et al. | |
| 2005/0102257 A1 | 5/2005 | Onyon et al. | |
| 2005/0102361 A1 | 5/2005 | Winjum et al. | |

(56) References Cited

U.S. PATENT DOCUMENTS

| | | |
|---|---|---|
| 2005/0108273 A1 | 5/2005 | Brebner |
| 2005/0131888 A1 | 6/2005 | Tafoya et al. |
| 2005/0138070 A1 | 6/2005 | Huberman et al. |
| 2005/0138631 A1 | 6/2005 | Bellotti et al. |
| 2005/0140653 A1 | 6/2005 | Pletikosa et al. |
| 2005/0149620 A1 | 7/2005 | Kirkland et al. |
| 2005/0159970 A1* | 7/2005 | Buyukkokten ........ G06Q 30/02 705/319 |
| 2005/0164704 A1 | 7/2005 | Winsor |
| 2005/0165584 A1 | 7/2005 | Boody et al. |
| 2005/0165893 A1 | 7/2005 | Feinberg et al. |
| 2005/0188028 A1 | 8/2005 | Brown, Jr. et al. |
| 2005/0198159 A1 | 9/2005 | Kirsch |
| 2005/0198299 A1 | 9/2005 | Beck et al. |
| 2005/0198305 A1 | 9/2005 | Pezaris et al. |
| 2005/0203929 A1 | 9/2005 | Hazarika et al. |
| 2005/0204009 A1 | 9/2005 | Hazarika et al. |
| 2005/0210111 A1 | 9/2005 | Fukudome |
| 2005/0213511 A1 | 9/2005 | Reece, Jr. et al. |
| 2005/0216300 A1 | 9/2005 | Appelman et al. |
| 2005/0222890 A1 | 10/2005 | Cheng et al. |
| 2005/0223315 A1 | 10/2005 | Shimizu et al. |
| 2005/0228881 A1 | 10/2005 | Reasor et al. |
| 2005/0228899 A1 | 10/2005 | Wendkos et al. |
| 2005/0234885 A1* | 10/2005 | Szeto .................. G06F 16/9535 |
| 2005/0235224 A1 | 10/2005 | Arend et al. |
| 2005/0278317 A1 | 12/2005 | Gross et al. |
| 2006/0004892 A1 | 1/2006 | Lunt et al. |
| 2006/0004914 A1 | 1/2006 | Kelly et al. |
| 2006/0015533 A1 | 1/2006 | Wolf et al. |
| 2006/0020398 A1 | 1/2006 | Vernon et al. |
| 2006/0031340 A1 | 2/2006 | Mathew et al. |
| 2006/0031775 A1 | 2/2006 | Sattler et al. |
| 2006/0041508 A1 | 2/2006 | Pham et al. |
| 2006/0047747 A1 | 3/2006 | Erickson et al. |
| 2006/0053199 A1 | 3/2006 | Pricken et al. |
| 2006/0056015 A1 | 3/2006 | Nishiyama |
| 2006/0059151 A1 | 3/2006 | Martinez et al. |
| 2006/0059238 A1 | 3/2006 | Slater et al. |
| 2006/0064404 A1* | 3/2006 | Kishore ............... G06F 16/951 |
| 2006/0064431 A1 | 3/2006 | Kishore et al. |
| 2006/0064434 A1 | 3/2006 | Gilbert et al. |
| 2006/0065733 A1 | 3/2006 | Lee et al. |
| 2006/0074932 A1 | 4/2006 | Fong et al. |
| 2006/0075046 A1 | 4/2006 | Yozell-Epstein et al. |
| 2006/0085752 A1 | 4/2006 | Beadle et al. |
| 2006/0095331 A1 | 5/2006 | O'Malley et al. |
| 2006/0095502 A1 | 5/2006 | Lewis et al. |
| 2006/0101285 A1 | 5/2006 | Chen et al. |
| 2006/0101334 A1 | 5/2006 | Liao et al. |
| 2006/0101350 A1 | 5/2006 | Scott |
| 2006/0123357 A1 | 6/2006 | Okamura |
| 2006/0129844 A1 | 6/2006 | Oshikiri |
| 2006/0136494 A1 | 6/2006 | Oh |
| 2006/0168059 A1 | 7/2006 | Chang et al. |
| 2006/0168073 A1 | 7/2006 | Kogan et al. |
| 2006/0173824 A1 | 8/2006 | Bensky et al. |
| 2006/0173961 A1 | 8/2006 | Turski et al. |
| 2006/0179415 A1 | 8/2006 | Cadiz et al. |
| 2006/0195361 A1 | 8/2006 | Rosenberg |
| 2006/0195474 A1 | 8/2006 | Cadiz et al. |
| 2006/0195785 A1 | 8/2006 | Portnoy et al. |
| 2006/0217116 A1 | 9/2006 | Cassett et al. |
| 2006/0218111 A1 | 9/2006 | Cohen |
| 2006/0224675 A1 | 10/2006 | Fox et al. |
| 2006/0224938 A1 | 10/2006 | Fikes et al. |
| 2006/0242536 A1 | 10/2006 | Yokokawa et al. |
| 2006/0242609 A1 | 10/2006 | Potter et al. |
| 2006/0248151 A1 | 11/2006 | Belakovskiy et al. |
| 2006/0256008 A1 | 11/2006 | Rosenberg |
| 2006/0265460 A1 | 11/2006 | Kiyohara |
| 2006/0271630 A1 | 11/2006 | Bensky et al. |
| 2006/0281447 A1 | 12/2006 | Lewis et al. |
| 2006/0282303 A1 | 12/2006 | Hale et al. |
| 2007/0005702 A1 | 1/2007 | Tokuda et al. |
| 2007/0005715 A1 | 1/2007 | LeVasseur et al. |
| 2007/0005750 A1 | 1/2007 | Lunt et al. |
| 2007/0011367 A1 | 1/2007 | Scott et al. |
| 2007/0016647 A1 | 1/2007 | Gupta et al. |
| 2007/0022447 A1 | 1/2007 | Arseneau et al. |
| 2007/0038720 A1 | 2/2007 | Reding et al. |
| 2007/0050711 A1 | 3/2007 | Walker et al. |
| 2007/0060328 A1 | 3/2007 | Zrike et al. |
| 2007/0071187 A1 | 3/2007 | Apreutesei et al. |
| 2007/0083651 A1 | 4/2007 | Ishida |
| 2007/0088687 A1 | 4/2007 | Bromm et al. |
| 2007/0106780 A1 | 5/2007 | Farnham et al. |
| 2007/0112761 A1 | 5/2007 | Xu et al. |
| 2007/0115991 A1 | 5/2007 | Ramani et al. |
| 2007/0118528 A1 | 5/2007 | Choi et al. |
| 2007/0123222 A1 | 5/2007 | Cox et al. |
| 2007/0124432 A1 | 5/2007 | Holtzman et al. |
| 2007/0129977 A1 | 6/2007 | Forney |
| 2007/0130527 A1 | 6/2007 | Kim |
| 2007/0135110 A1 | 6/2007 | Athale et al. |
| 2007/0143414 A1 | 6/2007 | Daigle |
| 2007/0153989 A1 | 7/2007 | Howell et al. |
| 2007/0156732 A1 | 7/2007 | Surendran et al. |
| 2007/0162432 A1 | 7/2007 | Armstrong et al. |
| 2007/0174304 A1 | 7/2007 | Shrufi et al. |
| 2007/0174432 A1 | 7/2007 | Rhee et al. |
| 2007/0177717 A1 | 8/2007 | Owens et al. |
| 2007/0185844 A1 | 8/2007 | Schachter |
| 2007/0192490 A1 | 8/2007 | Minhas |
| 2007/0192699 A1 | 8/2007 | Lee et al. |
| 2007/0198500 A1 | 8/2007 | Lucovsky et al. |
| 2007/0203991 A1 | 8/2007 | Fisher et al. |
| 2007/0208802 A1 | 9/2007 | Barman et al. |
| 2007/0214141 A1 | 9/2007 | Sittig et al. |
| 2007/0218900 A1 | 9/2007 | Abhyanker |
| 2007/0244881 A1 | 10/2007 | Cha et al. |
| 2007/0245245 A1* | 10/2007 | Blue ...................... G06Q 10/10 715/739 |
| 2007/0250585 A1 | 10/2007 | Ly et al. |
| 2007/0255794 A1 | 11/2007 | Coutts |
| 2007/0266001 A1 | 11/2007 | Williams et al. |
| 2007/0271232 A1* | 11/2007 | Mattox .................. G06Q 50/01 |
| 2007/0271527 A1 | 11/2007 | Paas et al. |
| 2007/0273517 A1 | 11/2007 | Govind |
| 2007/0276801 A1* | 11/2007 | Lawrence ........... G06F 16/9535 |
| 2007/0282956 A1 | 12/2007 | Staats |
| 2007/0288578 A1 | 12/2007 | Pantalone |
| 2007/0294428 A1 | 12/2007 | Guy et al. |
| 2008/0005247 A9 | 1/2008 | Khoo |
| 2008/0005249 A1 | 1/2008 | Hart |
| 2008/0031241 A1 | 2/2008 | Toebes et al. |
| 2008/0037721 A1 | 2/2008 | Yao et al. |
| 2008/0040370 A1 | 2/2008 | Bosworth et al. |
| 2008/0040435 A1 | 2/2008 | Buschi et al. |
| 2008/0040474 A1 | 2/2008 | Zuckerberg et al. |
| 2008/0040475 A1 | 2/2008 | Bosworth et al. |
| 2008/0055263 A1 | 3/2008 | Lemay et al. |
| 2008/0056259 A1 | 3/2008 | Madhani et al. |
| 2008/0059447 A1* | 3/2008 | Winner ............... G06F 16/9535 |
| 2008/0065604 A1* | 3/2008 | Tiu ......................... H04L 51/32 |
| 2008/0065701 A1 | 3/2008 | Lindstrom et al. |
| 2008/0071872 A1 | 3/2008 | Gross |
| 2008/0077614 A1 | 3/2008 | Roy |
| 2008/0091834 A1* | 4/2008 | Norton ................... H04L 51/32 709/229 |
| 2008/0104052 A1 | 5/2008 | Ryan et al. |
| 2008/0113674 A1 | 5/2008 | Baig |
| 2008/0114758 A1 | 5/2008 | Rupp et al. |
| 2008/0119201 A1 | 5/2008 | Kolber et al. |
| 2008/0120411 A1 | 5/2008 | Eberle |
| 2008/0122796 A1 | 5/2008 | Jobs et al. |
| 2008/0134081 A1 | 6/2008 | Jeon et al. |
| 2008/0147633 A1* | 6/2008 | Chandley ............ G06F 16/9535 |
| 2008/0147639 A1 | 6/2008 | Hartman et al. |
| 2008/0147810 A1 | 6/2008 | Kumar et al. |
| 2008/0154751 A1 | 6/2008 | Miles |
| 2008/0162347 A1 | 7/2008 | Wagner |
| 2008/0162649 A1 | 7/2008 | Lee et al. |
| 2008/0162651 A1 | 7/2008 | Madnani |

(56) References Cited

U.S. PATENT DOCUMENTS

| | | |
|---|---|---|
| 2008/0163164 A1 | 7/2008 | Chowdhary et al. |
| 2008/0170158 A1 | 7/2008 | Jung et al. |
| 2008/0172362 A1 | 7/2008 | Shacham et al. |
| 2008/0172464 A1 | 7/2008 | Thattai et al. |
| 2008/0183832 A1 | 7/2008 | Kirkland et al. |
| 2008/0208812 A1 | 8/2008 | Quoc et al. |
| 2008/0216092 A1 | 9/2008 | Serlet |
| 2008/0220752 A1 | 9/2008 | Forstall et al. |
| 2008/0222279 A1 | 9/2008 | Cioffi et al. |
| 2008/0222546 A1 | 9/2008 | Mudd et al. |
| 2008/0235353 A1 | 9/2008 | Cheever et al. |
| 2008/0235681 A1 | 9/2008 | Barnett |
| 2008/0242277 A1 | 10/2008 | Chen et al. |
| 2008/0243841 A1 | 10/2008 | Bonnet et al. |
| 2008/0244070 A1 | 10/2008 | Kita et al. |
| 2008/0261569 A1 | 10/2008 | Britt et al. |
| 2008/0270038 A1 | 10/2008 | Partovi et al. |
| 2008/0270939 A1 | 10/2008 | Mueller |
| 2008/0275748 A1 | 11/2008 | John |
| 2008/0275865 A1 | 11/2008 | Kretz et al. |
| 2008/0293403 A1 | 11/2008 | Quon et al. |
| 2008/0301166 A1 | 12/2008 | Sugiyama et al. |
| 2008/0301175 A1 | 12/2008 | Applebaum et al. |
| 2008/0301245 A1 | 12/2008 | Estrada et al. |
| 2008/0307046 A1 | 12/2008 | Baek et al. |
| 2008/0307066 A1 | 12/2008 | Amidon et al. |
| 2008/0319943 A1 | 12/2008 | Fischer |
| 2008/0320417 A1 | 12/2008 | Begley et al. |
| 2009/0005076 A1 | 1/2009 | Forstall et al. |
| 2009/0006366 A1 | 1/2009 | Johnson et al. |
| 2009/0010353 A1 | 1/2009 | She et al. |
| 2009/0012806 A1 | 1/2009 | Ricordi et al. |
| 2009/0029674 A1 | 1/2009 | Brezina et al. |
| 2009/0030773 A1 | 1/2009 | Kamhoot |
| 2009/0030872 A1 | 1/2009 | Brezina et al. |
| 2009/0030919 A1 | 1/2009 | Brezina et al. |
| 2009/0030927 A1 | 1/2009 | Cases et al. |
| 2009/0030933 A1 | 1/2009 | Brezina et al. |
| 2009/0030940 A1 | 1/2009 | Brezina et al. |
| 2009/0031232 A1* | 1/2009 | Brezina ............... H04M 15/00 715/764 |
| 2009/0031244 A1 | 1/2009 | Brezina et al. |
| 2009/0031245 A1 | 1/2009 | Brezina et al. |
| 2009/0037541 A1 | 2/2009 | Wilson |
| 2009/0041224 A1 | 2/2009 | Bychkov et al. |
| 2009/0048994 A1 | 2/2009 | Applebaum et al. |
| 2009/0054091 A1 | 2/2009 | van Wijk et al. |
| 2009/0070412 A1 | 3/2009 | D'Angelo et al. |
| 2009/0076795 A1 | 3/2009 | Bangalore et al. |
| 2009/0077026 A1 | 3/2009 | Yanagihara |
| 2009/0082038 A1* | 3/2009 | McKiou ............... H04W 4/029 455/456.6 |
| 2009/0083278 A1 | 3/2009 | Zhao et al. |
| 2009/0100384 A1 | 4/2009 | Louch |
| 2009/0106415 A1 | 4/2009 | Brezina et al. |
| 2009/0106676 A1 | 4/2009 | Brezina et al. |
| 2009/0111495 A1 | 4/2009 | Sjolin et al. |
| 2009/0112678 A1 | 4/2009 | Luzardo |
| 2009/0119678 A1 | 5/2009 | Shih et al. |
| 2009/0132949 A1 | 5/2009 | Bosarge |
| 2009/0138546 A1* | 5/2009 | Cruzada ............... G06Q 10/10 709/203 |
| 2009/0156170 A1 | 6/2009 | Rossano et al. |
| 2009/0157717 A1 | 6/2009 | Palahnuk et al. |
| 2009/0164902 A1 | 6/2009 | Cohen et al. |
| 2009/0171690 A1* | 7/2009 | Lubarski ............ G06Q 10/1057 705/342 |
| 2009/0171930 A1 | 7/2009 | Vaughan et al. |
| 2009/0171979 A1 | 7/2009 | Lubarski et al. |
| 2009/0174680 A1 | 7/2009 | Anzures et al. |
| 2009/0177754 A1 | 7/2009 | Brezina et al. |
| 2009/0182552 A1 | 7/2009 | Fyke et al. |
| 2009/0182788 A1 | 7/2009 | Chung et al. |
| 2009/0191899 A1 | 7/2009 | Wilson et al. |
| 2009/0198688 A1 | 8/2009 | Venkataraman et al. |
| 2009/0204903 A1 | 8/2009 | Edelen et al. |
| 2009/0209286 A1 | 8/2009 | Bentley et al. |
| 2009/0213088 A1 | 8/2009 | Hardy et al. |
| 2009/0217178 A1 | 8/2009 | Niyogi et al. |
| 2009/0228555 A1* | 9/2009 | Joviak ................. G06Q 10/107 709/205 |
| 2009/0234815 A1 | 9/2009 | Boerries et al. |
| 2009/0234925 A1 | 9/2009 | Seippel, III et al. |
| 2009/0240669 A1 | 9/2009 | Ando et al. |
| 2009/0248415 A1 | 10/2009 | Jablokov et al. |
| 2009/0249198 A1 | 10/2009 | Davis et al. |
| 2009/0271370 A1 | 10/2009 | Jagadish et al. |
| 2009/0271409 A1 | 10/2009 | Ghosh |
| 2009/0276713 A1 | 11/2009 | Eddy |
| 2009/0299824 A1 | 12/2009 | Barnes, Jr. |
| 2009/0300127 A1 | 12/2009 | Du |
| 2009/0300546 A1 | 12/2009 | Kwok et al. |
| 2009/0306981 A1 | 12/2009 | Cromack et al. |
| 2009/0313573 A1 | 12/2009 | Paek et al. |
| 2009/0319329 A1 | 12/2009 | Aggarwal et al. |
| 2009/0319521 A1* | 12/2009 | Groeneveld .......... G06F 16/951 |
| 2009/0327849 A1 | 12/2009 | Kavanagh et al. |
| 2009/0328161 A1 | 12/2009 | Puthenkulam et al. |
| 2010/0009332 A1 | 1/2010 | Yaskin et al. |
| 2010/0030715 A1 | 2/2010 | Eustice et al. |
| 2010/0036833 A1 | 2/2010 | Yeung et al. |
| 2010/0049534 A1 | 2/2010 | Whitnah et al. |
| 2010/0057858 A1 | 3/2010 | Shen et al. |
| 2010/0057859 A1 | 3/2010 | Shen et al. |
| 2010/0060595 A1 | 3/2010 | Lee et al. |
| 2010/0062753 A1 | 3/2010 | Wen et al. |
| 2010/0070875 A1 | 3/2010 | Turski et al. |
| 2010/0073284 A1 | 3/2010 | Dods et al. |
| 2010/0077041 A1 | 3/2010 | Cowan et al. |
| 2010/0082693 A1 | 4/2010 | Hugg et al. |
| 2010/0083182 A1 | 4/2010 | Liu et al. |
| 2010/0088340 A1 | 4/2010 | Muller et al. |
| 2010/0094869 A1 | 4/2010 | Ebanks |
| 2010/0100899 A1 | 4/2010 | Bradbury et al. |
| 2010/0121831 A1 | 5/2010 | Lin et al. |
| 2010/0131447 A1 | 5/2010 | Creutz et al. |
| 2010/0153832 A1 | 6/2010 | Markus et al. |
| 2010/0158214 A1 | 6/2010 | Gravino et al. |
| 2010/0161547 A1 | 6/2010 | Carmel et al. |
| 2010/0161729 A1 | 6/2010 | Leblanc et al. |
| 2010/0162171 A1 | 6/2010 | Felt et al. |
| 2010/0164957 A1 | 7/2010 | Lindsay et al. |
| 2010/0167700 A1 | 7/2010 | Brock et al. |
| 2010/0169327 A1 | 7/2010 | Lindsay et al. |
| 2010/0174784 A1 | 7/2010 | Levey et al. |
| 2010/0185610 A1 | 7/2010 | Lunt et al. |
| 2010/0191844 A1 | 7/2010 | He et al. |
| 2010/0216509 A1 | 8/2010 | Riemer et al. |
| 2010/0228560 A1 | 9/2010 | Balasaygun et al. |
| 2010/0229096 A1 | 9/2010 | Maiocco et al. |
| 2010/0229223 A1 | 9/2010 | Shepard et al. |
| 2010/0235375 A1 | 9/2010 | Sidhu et al. |
| 2010/0241579 A1 | 9/2010 | Bassett et al. |
| 2010/0250682 A1 | 9/2010 | Goldberg et al. |
| 2010/0273456 A1 | 10/2010 | Wolovitz et al. |
| 2010/0281535 A1 | 11/2010 | Perry, Jr. et al. |
| 2010/0306185 A1 | 12/2010 | Smith et al. |
| 2010/0312837 A1 | 12/2010 | Bodapati et al. |
| 2010/0318614 A1 | 12/2010 | Sager et al. |
| 2010/0330972 A1 | 12/2010 | Angiolillo |
| 2011/0010423 A1 | 1/2011 | Thatcher et al. |
| 2011/0035451 A1 | 2/2011 | Smith et al. |
| 2011/0040726 A1 | 2/2011 | Crosbie et al. |
| 2011/0072052 A1 | 3/2011 | Skarin et al. |
| 2011/0078259 A1 | 3/2011 | Rashad et al. |
| 2011/0086627 A1 | 4/2011 | Khosravi |
| 2011/0087969 A1 | 4/2011 | Hein et al. |
| 2011/0119593 A1 | 5/2011 | Jacobson et al. |
| 2011/0145192 A1 | 6/2011 | Quintela et al. |
| 2011/0145219 A1 | 6/2011 | Cierniak et al. |
| 2011/0173274 A1 | 7/2011 | Sood |
| 2011/0173547 A1 | 7/2011 | Lewis et al. |
| 2011/0191337 A1 | 8/2011 | Cort et al. |
| 2011/0191340 A1 | 8/2011 | Cort et al. |

(56) References Cited

U.S. PATENT DOCUMENTS

| | | |
|---|---|---|
| 2011/0191717 A1 | 8/2011 | Cort et al. |
| 2011/0196802 A1 | 8/2011 | Ellis et al. |
| 2011/0201275 A1 | 8/2011 | Jabara et al. |
| 2011/0219317 A1 | 9/2011 | Thatcher et al. |
| 2011/0225293 A1 | 9/2011 | Rathod |
| 2011/0231407 A1 | 9/2011 | Gupta et al. |
| 2011/0235790 A1 | 9/2011 | Strope et al. |
| 2011/0252383 A1 | 10/2011 | Miyashita |
| 2011/0276396 A1 | 11/2011 | Rathod |
| 2011/0282905 A1 | 11/2011 | Polis et al. |
| 2011/0291860 A1 | 12/2011 | Ozaki et al. |
| 2011/0291933 A1 | 12/2011 | Holzer et al. |
| 2011/0298701 A1 | 12/2011 | Holzer et al. |
| 2012/0011204 A1 | 1/2012 | Morin et al. |
| 2012/0017158 A1 | 1/2012 | Maguire et al. |
| 2012/0023416 A1 | 1/2012 | Khoo |
| 2012/0036254 A1 | 2/2012 | Onuma |
| 2012/0041907 A1 | 2/2012 | Wang et al. |
| 2012/0054681 A1 | 3/2012 | Cort et al. |
| 2012/0060102 A1 | 3/2012 | Shohfi et al. |
| 2012/0079023 A1 | 3/2012 | Tejada-Gamero et al. |
| 2012/0084461 A1 | 4/2012 | Athias et al. |
| 2012/0089678 A1 | 4/2012 | Cort et al. |
| 2012/0089690 A1 | 4/2012 | Hein et al. |
| 2012/0110080 A1 | 5/2012 | Panyam et al. |
| 2012/0110096 A1 | 5/2012 | Smarr et al. |
| 2012/0150970 A1 | 6/2012 | Peterson et al. |
| 2012/0150978 A1 | 6/2012 | Monaco et al. |
| 2012/0150979 A1 | 6/2012 | Monaco |
| 2012/0166999 A1 | 6/2012 | Thatcher et al. |
| 2012/0197871 A1 | 8/2012 | Mandel et al. |
| 2012/0198348 A1 | 8/2012 | Park |
| 2012/0204089 A1 | 8/2012 | Boudreau et al. |
| 2012/0246065 A1 | 9/2012 | Yarvis et al. |
| 2012/0259834 A1 | 10/2012 | Broder et al. |
| 2012/0271822 A1 | 10/2012 | Schwendimann et al. |
| 2012/0278428 A1 | 11/2012 | Harrison et al. |
| 2012/0310977 A1 | 12/2012 | Bush et al. |
| 2012/0330658 A1 | 12/2012 | Bonforte |
| 2012/0330980 A1 | 12/2012 | Rubin et al. |
| 2012/0331418 A1 | 12/2012 | Bonforte |
| 2013/0007627 A1 | 1/2013 | Monaco |
| 2013/0014021 A1 | 1/2013 | Bau et al. |
| 2013/0053074 A1 | 2/2013 | Sanchez et al. |
| 2013/0080915 A1 | 3/2013 | Lewis et al. |
| 2013/0091288 A1 | 4/2013 | Shalunov et al. |
| 2013/0173712 A1 | 7/2013 | Monjas Llorente et al. |
| 2013/0246931 A1 | 9/2013 | Harris et al. |
| 2013/0260795 A1 | 10/2013 | Papakipos et al. |
| 2014/0011481 A1 | 1/2014 | Kho |
| 2014/0081914 A1 | 3/2014 | Smith et al. |
| 2014/0081964 A1 | 3/2014 | Rubin et al. |
| 2014/0087687 A1 | 3/2014 | Brezina et al. |
| 2014/0089304 A1 | 3/2014 | Rubin et al. |
| 2014/0089411 A1 | 3/2014 | Rubin et al. |
| 2014/0095433 A1 | 4/2014 | Cort et al. |
| 2014/0100861 A1 | 4/2014 | Ledet |
| 2014/0115086 A1 | 4/2014 | Chebiyyam |
| 2014/0156650 A1 | 6/2014 | Jacobson |
| 2014/0207761 A1 | 7/2014 | Brezina et al. |
| 2014/0214981 A1 | 7/2014 | Mallet et al. |
| 2014/0215626 A1 | 7/2014 | Pam et al. |
| 2014/0280097 A1 | 9/2014 | Lee et al. |
| 2014/0287786 A1 | 9/2014 | Bayraktar et al. |
| 2015/0074213 A1 | 3/2015 | Monaco |
| 2015/0094043 A1* | 4/2015 | Collins .................. G06Q 10/10 455/414.1 |
| 2015/0170650 A1 | 6/2015 | Bonforte |
| 2015/0222719 A1 | 8/2015 | Hein et al. |
| 2016/0070787 A1 | 3/2016 | Brezina et al. |
| 2016/0182661 A1 | 6/2016 | Brezina et al. |
| 2017/0171124 A1 | 6/2017 | Brezina et al. |

FOREIGN PATENT DOCUMENTS

| | | |
|---|---|---|
| JP | 2003006116 | 1/2003 |
| JP | 2007249307 | 9/2007 |
| KR | 20060056015 | 5/2006 |
| KR | 1020090068819 | 6/2009 |
| KR | 1020090112257 | 10/2009 |
| KR | 1020090115239 | 11/2009 |
| KR | 1020020060386 | 8/2012 |
| WO | WO 2000/030318 | * 5/2000 |
| WO | WO 2003/060768 | * 7/2003 |
| WO | 2003098515 | 11/2003 |
| WO | 2007037875 | 4/2007 |
| WO | 2007143232 | 12/2007 |
| WO | 2012082886 | 6/2012 |
| WO | 2012082929 | 6/2012 |

OTHER PUBLICATIONS

"The Ultimate Guide for Everything Twitter", Webdesigner Depot, archive.org copy of webpage https://web.archive.org/web/20090325042115/http://www.webdesignerdepot.com/2009/03/the-ultimate-guide-for-everything- twitter/ from Mar. 25, 2009.

Android-Tips.com, "Android Tips & Tricks: How to Import Contacts into Android Phone," located at http://android-tips.com/how-to-import-contacts-into-android/, Nov. 17, 2008 (document provided includes third-party comments submitted under the USPTO PeerToPatent program).

Bernstein, Michael S. et al., "Enhancing Directed Content Sharing on the Web," Proceedings of the 28th International Conference on Human Factors in Computing Systems, Atlanta, GA, Apr. 10-15, 2010, pp. 971-980.

Carvalho, Vitor R. et al., "Ranking Users for Intelligent Message Addressing," Proceedings of the 30th European Conference on Information Retrieval, Glasgow, England, Mar. 30-Apr. 3, 2008, pp. 321-333.

Culotta, Aron et al., "Extracting Social Networks and Contact Information from Email and the Web," Proceedings of the First Conference on Email and Anti-Spam (CEAS), Mountain View, CA, Jul. 30-31, 2004 (document provided includes third-party comments submitted under the USPTO PeerToPatent program).

Elsayed, Tamer et al., "Personal Name Resolution in Email: A Heuristic Approach," University of Maryland Technical Report No. TR-LAMP-150, Mar. 17, 2008.

Epstein, "Harnessing User Data to Improve Facebook Features", Doctoral dissertation, Boston College, May 12, 2010.

European Patent Application No. 11849271.9, Extended Search Report, dated Apr. 3, 2014.

European Patent Application No. 12801970.0, Extended Search Report, dated Oct. 23, 2014.

European Patent Application 12801998.1, Extended Search Report, dated Feb. 10, 2015.

European Patent Application No. 10797483.4, extended European Search Report, dated Dec. 20, 2016.

Extended European Search Report, EP 10 78 3783, dated Mar. 24, 2014.

Fitzpatrick, Brad, "AddressBooker," Github Social Coding, located at http://addressbooker.appspot.com/, Nov. 28, 2008 (document provided includes third-party comments submitted under the USPTO PeerToPatent program).

Google Inc. "OpenSocial Tutorial," located at http://code.google.com/apis/opensocial/articles/tutorial/tutorial-0.8.html, Aug. 2008.

Google Inc., "Automatic Updating of Contacts," Gmail help forum, located at http://74.125.4.16/support/forum/p/gmail/thread?tid=03f7b692150d9242&hl=en, Apr. 27, 2009 (document provided includes third-party comments submitted under the USPTO PeerToPatent program).

Hillebrand, Tim, "Plaxo: The Smart Auto Update Address Book," Smart Phone Mag, located at http://www.smartphonemag.com/cms/blogs/9/plaxo_the_smart_auto_update_address_book, Nov. 6, 2006 (document provided includes third-party comments submitted under the USPTO PeerToPatent program).

(56) References Cited

OTHER PUBLICATIONS

Hannon et al., "Recommending Twitter Users to Follow Using Content and Collaborative Filtering Approaches", RecSys2010, Sep. 26-30, 2010, Barcelona, Spain.
International Patent Application PCT/US10/34782, International Search Report and Written Opinion, dated Dec. 22, 2010.
International Patent Application PCT/US10/35405, International Search Report and Written Opinion, dated Jan. 3, 2011.
International Patent Application PCT/US10/52081, International Search Report and Written Opinion, dated May 20, 2011.
International Patent Application PCT/US10/56560, International Search Report and Written Opinion, dated Jun. 21, 2011.
International Patent Application PCT/US11/64958, International Search Report and Written Opinion, dated Jul. 31, 2012.
International Patent Application PCT/USI2/043523, International Search Report and Written Opinion, dated Nov. 28, 2012.
International Patent Application PCT/US2011/064892, International Search Report and Written Opinion, dated Aug. 22, 2012.
International Patent Application PCT/US2012/043507, International Search Report and Written Opinion, dated Jan. 3, 2013.
Microsoft Corporation, "About AutoComplete Name Suggesting," Microsoft Outlook 2003 help forum, located at http://office.microsoft.com/en-us/outlook/HP063766471033.aspx, 2003.
Oberhaus, Kristin, "Look for Cues: Targeting Without Personally Identifiable Information," W3i, LLC blog entry located at http://blog.w3i.com/2009/09/03/looking-for-cues-targeting-without-personally-identifiable-information/, Sep. 3, 2009.
OpenSocial Foundation, "Social Application Tutorial (v0.9)," located at http://wiki.opensocial.org/index.php?title=Social_Application_Tutorial, accessed Oct. 8, 2010.
PCWorld Communications, Inc., "Your Contacts Are Forever: Self-Updating Address Book," located at http://www.pcworld.com/article/48192/your_contacts_are_forever_selfupdating_address_book.html, May 1, 2001 (document provided includes third-party comments submitted under the USPTO PeerToPatent program).
U.S. Appl. No. 61/407,018, filed Oct. 27, 2010.
W3i, LLC, "Advertiser Feedback System (AFS)," company product description. Sep. 22, 2009.
Wikimedia Foundation, Inc., "Machine Learning," Wikipedia encyclopedia entry located at http://en.wikipedia.org/wiki/Machine_learning, Jan. 30, 2011.

\* cited by examiner

SELF POPULATING ADDRESS BOOK

CROSS REFERENCES AND RELATED APPLICATIONS

This application is a continuation application of U.S. patent application Ser. No. 14/084,491, filed on Nov. 19, 2013, which itself is a continuation application of U.S. patent application Ser. No. 12/792,698, filed on Jun. 2, 2010, which itself claims priority to U.S. Prov. App. No. 61/183,315, filed Jun. 2, 2009, and also which itself is a continuation application of and claims priority to International Application PCT/US10/35405, filed 19 May 2010, which itself claims priority to U.S. Prov. App. No. 61/183,315, filed Jun. 2, 2009, all entitled "Self Populating Address Book," the entire disclosure of which applications are incorporated herein by reference.

BACKGROUND

Electronic communications between persons for both business and personal use have increased substantially in recent years. In addition to e-mail communications and telephone communications, additional forms of communication have become common, including instant messaging, social network messaging and commenting, message board posting, and text messaging to name a few examples.

Conventional computing systems and devices are configured to support applications such as e-mail or instant messaging that implement an address book. The address book may be accessed by a user of the application (or by the application itself) for a variety of purposes. Typically, the address book is unique for a given application and may contain unique application specific data.

In conventional applications, each address book entry must be manually entered and maintained by a user. Over time, some entries become outdated due to a lack of regular maintenance, while other entries become obsolete (e.g., entries of individuals with whom no further communications are intended). As the number of contacts grows, the maintenance of the address book may become difficult and time consuming.

SUMMARY

System, methods and computer program products for creating and maintaining an address book are described. The address book may collect or update its existing contact information from sent or received communications. Contact information associated with the existing contacts also may be collected (or updated based on information received) from outside sources (e.g., external to an application hosting or accessing the address book). The address book may intelligently combine profile data from various sources to enrich the existing records associated with the contacts.

In some implementations, a method may include receiving contact information associated with a contact from a first source, establishing a new contact profile containing the contact information in an address book, locating information related to the contact from a second source, and updating the new contact profile in the address book automatically based on the located information.

In some implementations, a method may include identifying one or more contacts in an address book of a user, each contact having an associated contact profile, analyzing each contact profile including identifying one or more entries in each contact profile, each entry containing information related to the contact, assigning one or more weights to the one or more entries based on one or more criteria, and ranking the one or more contact profiles based on the one or more assigned weights.

In some implementations, a method may include receiving a request from a user of an address book to communicate with one or more recipients, the request containing one or more criteria for identifying one or more contacts in the address book as the recipients, searching the address book for one or more contacts whose contact profile contains information that satisfies at least one criteria, prioritizing the searched contacts based on the one or more criteria satisfied, and presenting a proposed list of recipients to the user based on the prioritized contacts.

The details of one or more embodiments of the invention are set forth in the accompanying drawings and the description below. Other features, objects, and advantages of the invention will be apparent from the description and drawings, and from the claims

DETAILED DESCRIPTION

Address Book Overview

An application address book along with methods, systems, apparatus, and computer program products for presenting, updating and maintaining the address book and its entries are described. The address book may be associated with a singular application or plural applications. The address book may be of the form of a stand alone application or integrated in a communication application that can support the address book. The address book may be configured to derive and/or retrieve information from other applications or processes to ensure the information in the address book is current. The address book may be formed from a compilation of profiles associated with individuals/entities and be associated with a communication application (e.g., e-mail application, or a messaging application). Alternatively, the address book may be a stand alone application that is accessed by a communication application or the like to retrieve or present address book content. The address book can include one or more records and routines for maintaining, updating, sharing, presenting, and searching the records. One example form of record is a person profile. Profiles, and in particular person profiles will be discussed initially by way of example in a communication system (e.g., an e-mail system). The address book may be used in this or other communication applications as desired. Aspects of the compilation of the profiles and/or other information into an address book, its creation, storage, maintenance, sharing, and presentation will be discussed thereafter.

Figure 1:
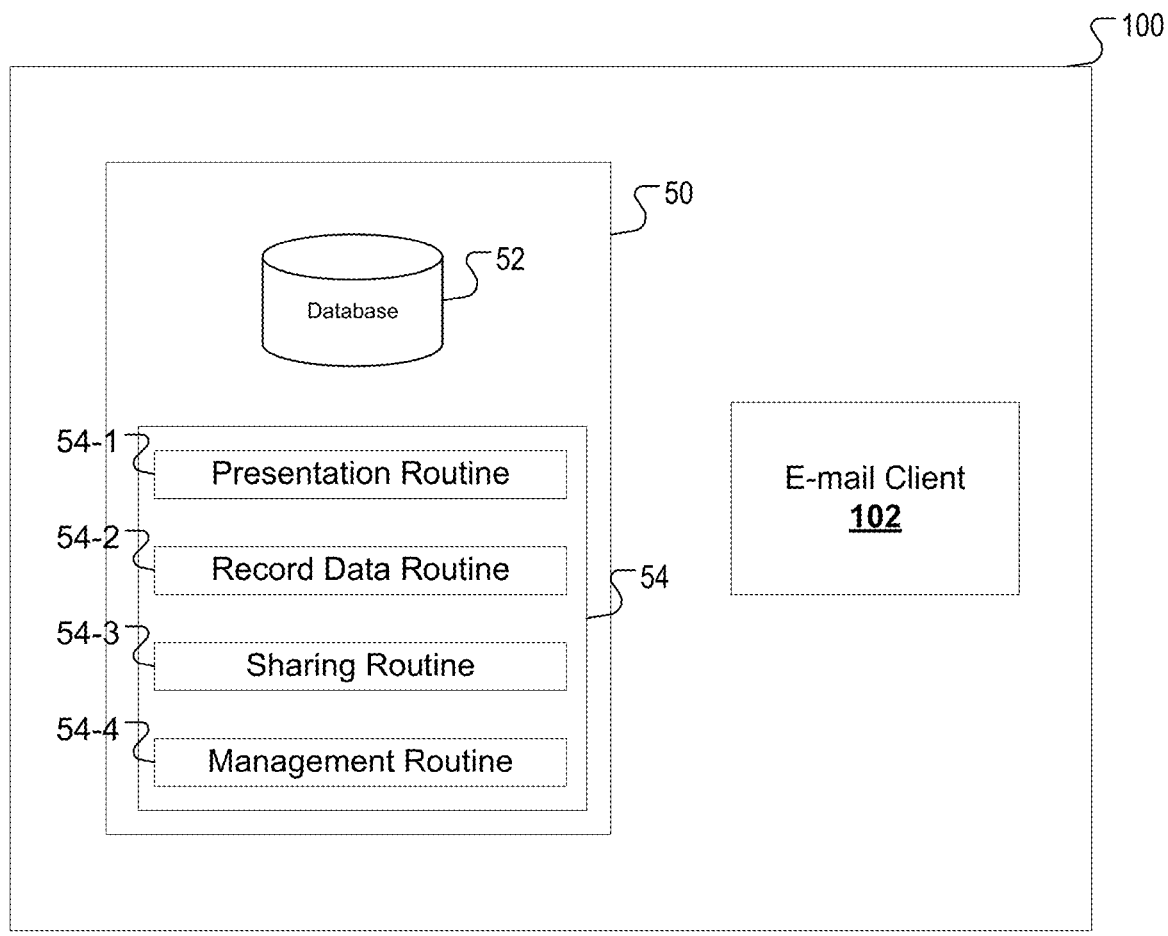
FIG. 1 shows an example architecture for a communication application that supports an address book.

FIG. 1 shows an example communication delivery system 100 for presenting records associated with an address book 50. The system 100 may include an e-mail client 102 which may access or include the address book 50. The address book 50 may include plural records stored in a database 52 and routines 54 (e.g., for updating, accessing, presenting, sharing, organizing and the like the records). In the example shown, routines 54 may include a presentation routine 54-1, record data routine 54-2, a sharing routine 54-3, and a management routine 54-4.

Presentation routine 54-1 may include methods or processes for presenting and accessing records associated with the address book 50. Presentation routine 54-1 may include one or more user interfaces for presenting the address book 50 or portion thereof. Presentation routine 54-1 may also include application program interfaces for allowing access to records stored in the database by an associated application or external application. Record data routine 54-2 may include methods or processes for creating, updating and maintaining records in the address book. Creation may be triggered explicitly by a user (e.g., by selecting or instructing that a new record be added to the address book 50) or implicitly (e.g., based on a newly generated/received communication from an individual that is not in the address book 50). Record data routine 54-2 may also include methods or processes for updating records in the address book 50 to ensure that information is current and accurate. Record data routine 54-2 may include augmentation methods or processes for enriching records, such as methods or processes for retrieving additional information from external sources to be added to a record (e.g., retrieval of a photo to be associated with a record). Sharing routine 54-3 may facilitate the import or export of portions (or the entire) of the address book 50. Management routine 54-4 may support other aspects of management of the address book 50, its records, and routines.

In the example shown, the address book 50 may be included as part of the e-mail client 102, though other configurations are possible. For example, the address book 50 may be a stand alone application that is either client or web based. When used as a stand alone application, the address book 50 may include one or more application program interfaces for allowing for information retrieval and access by other applications.

In some implementations, the address book 50 may be developed as a stand alone application for managing one or more contacts associated with a user (or owner of the address book). The address book 50 may import contacts from (or export to) other applications, systems or devices (e.g., Microsoft Outlook®, Blackberry® devices, iPhones, etc.) forming a record (e.g., person profile) for each. Where the address book 50 is developed as a stand alone application, the user associated with the address book 50 also may access the address book 50 from, for example, the owner's e-mail clients, social networks, mobile phones, instant messaging networks and the like.

The contacts listed in the address book 50 may include contacts that are associated with the user of the address book 50. The contacts may include recipients of communications from the user, recipients of communications of which the user is also a recipient, individuals named in a body or header of a communication with the user, or individuals named in a document that is attached to a communication with the user. For example, a person who was copied on an e-mail with the user being one of many recipients may be listed as a contact in the address book 50. In another example, if the user receives an e-mail with the subject line "Eric Grafstrom's Anniversary at Company A", the name "Eric Grafstrom" may be listed as a contact in the address book 50, even if "Eric Grafstrom" has never been included in or been the recipient of any communications from the user.

In some implementations, the user may receive a list of contacts (through sharing) from another user or contact. The user also may share its list of contacts (e.g., share a portion of the address book 50) on a network with other users (as will be discussed in greater detail below), or by sending a communication to another user/contact that includes the contact information (e.g., in a body of the communication or in an attachment to the communication).

The address book 50 may populate or update its existing contact information from received communications (e.g., e-mails received). For example, the address book 50 may parse through one or more e-mails managed by the e-mail client 102, capture every sender and recipient (e.g., including those listed in the "cc" or "bcc" field) in those e-mails, identify information that may be linked to a given contact, create a record (e.g., a person profile) for the contact and maintain the record in the address book 50.

Contact information associated with the existing contacts also may be collected or updated from outside sources (e.g., using a search engine that is part of or accessible by routines associated with the address book 50). The outside sources may include information gathered from company web sites, personal web sites, social network web pages or other information sources (e.g., person search directory pages, photo or video sharing websites, travel websites, online retailers, and maps and directions websites). As an example, the address book 50 may update or expand its profiles (e.g., including updating or populating entry fields associated with the existing contacts) by crawling through web pages to gather additional information to be included in a profile. For example, the address book 50 may utilize conventional web crawlers to crawl through web sites such as, without limitation, social networking web sites such as Facebook®, Myspace®, LinkedIn®, Twitter®, Xanga®, Friendster®, YouTube® and Orkut®, gaming sites, gaming networks, photo services, and content sharing sites such as music and video sharing sites, people search engines, telephone directories, scanned business card data, and the like. Other types of online networks, communities or personal web pages may be searched including, for example, job hunting websites (e.g., monster.com), school alumni websites, organizations of professionals, Internet dating sites, ratings sites (e.g., epinions.com, Yelp.com), closed or proprietary networks, instant message networks, and company internal websites (e.g., Intranet). Web pages may be crawled on a scheduled basis or in response to a user input, and the retrieved information may be sorted and stored in the address book 50.

As an example, a search of a social network may be performed (e.g., by a search engine accessed by or associated with address book 50) based on a contact's name, e-mail address, screen names or other information about the contact (e.g., as previously collected). A profile page on the social network belonging to the contact may be identified. Personal information may then be located and used to update the existing record associated with that contact in the address book 50. Users that are publicly listed on a social network profile page associated with the user of the address book may also be captured and associated with the user in the address book.

As another example, the address book 50 may parse the user's e-mail inbox on a Blackberry® device to retrieve personal information of an existing or potential contact (e.g., a sender, a recipient or person(s) named in the body of an e-mail) such as name, company information, job title, phone number and information suitable for analyzing the patterns of communication between the user and the contact. The address book 50 may blend the retrieved information with third party data from third parties such as Facebook®, Hoover®, and LinkedIn® to enrich and enhance the profile content of each contact in the address book 50.

The address book 50 also may index the user's e-mail to permit quick index searching and to allow easy and convenient access to contact information. For example, the user may enter the name of contact "A" via a user interface (e.g., provided by the presentation routine 54-1), and in response, the address book 50 may return the contact profile of contact "A" as well as every e-mail, attachment and access information to parties who are on these threads. The address book 50 also may display a total number of relevant contacts based on the search results (e.g., one other contact that has the same name as contact "A"), and the number of relevant e-mails, attachments and parties that are associated with contact "A" to aid the user in identifying, for example, the currency of communications between the user and contact "A" (e.g., contact information retrieved for contact "A" is current because the user received three e-mails, two IM messages and one comment on the user's social profile page from contact "A" last week).

In some implementations, the address book 50 may gather its contact information from multiple sources. For example, the address book 50 may collect or update its contact information by querying multiple user accounts (e.g., from various e-mail accounts, IM accounts, social network accounts and the like), multiple communications applications (e.g., from various e-mail applications, mobile applications, desktop applications and the like), and multiple documents (e.g., e-mails, text messages, phone directories, personal web pages, company profiles, daily or archived news and the like) associated with each user, company or organization.

The address book 50 also may intelligently combine profile data from multiple sources to enrich the existing records associated with the contacts. For example, if a particular contact lists a company e-mail address at one source and a personal e-mail address at another source, then both of these e-mail addresses may be combined and the entry associated with the contact may be updated accordingly to reflect both of these addresses. In so doing, the address book 50 ensures that each contact profile is as complete and current as possible.

Once collected, the contact information in the address book 50 may be manually searched by the user. For example, the user may enter "Steve" in the user interface associated with the address book 50, and the search result may show data related to "Steve". If the address book 50 includes more than one "Steve" (e.g., where the address book 50 includes "Steve Joffey", "Steve Markum" or "Steve Randall"), then the user interface may display one or more fields about each "Steve" (e.g., name, email address, job title and the like) to allow the user to identify the appropriate "Steve". If desired, the user interface also may display other meta-data information associated with each "Steve" to expedite the recognition process.

In some implementations, the address book 50 may implement a process to determine whether two or more existing address book records (or contact profiles) stored in the address book 50 share the same content for a data type, such as name, telephone number, and email address, when content is sorted by the data type. For example, the management routine 54-4 may interpret records that share the same content for a data type as duplicate records. The management routine 54-4 may combine the sets of data entries for all data types included in duplicate records into a single address book record. For example, the management routine 54-4 may create a single address book record by combining the common data entries with the unique data entries of duplicate records to create a new address book record, store the new address book record in the address book 50, and delete the duplicate records from the address book 50.

Viewing Records in the Address Book

Figure 2A:
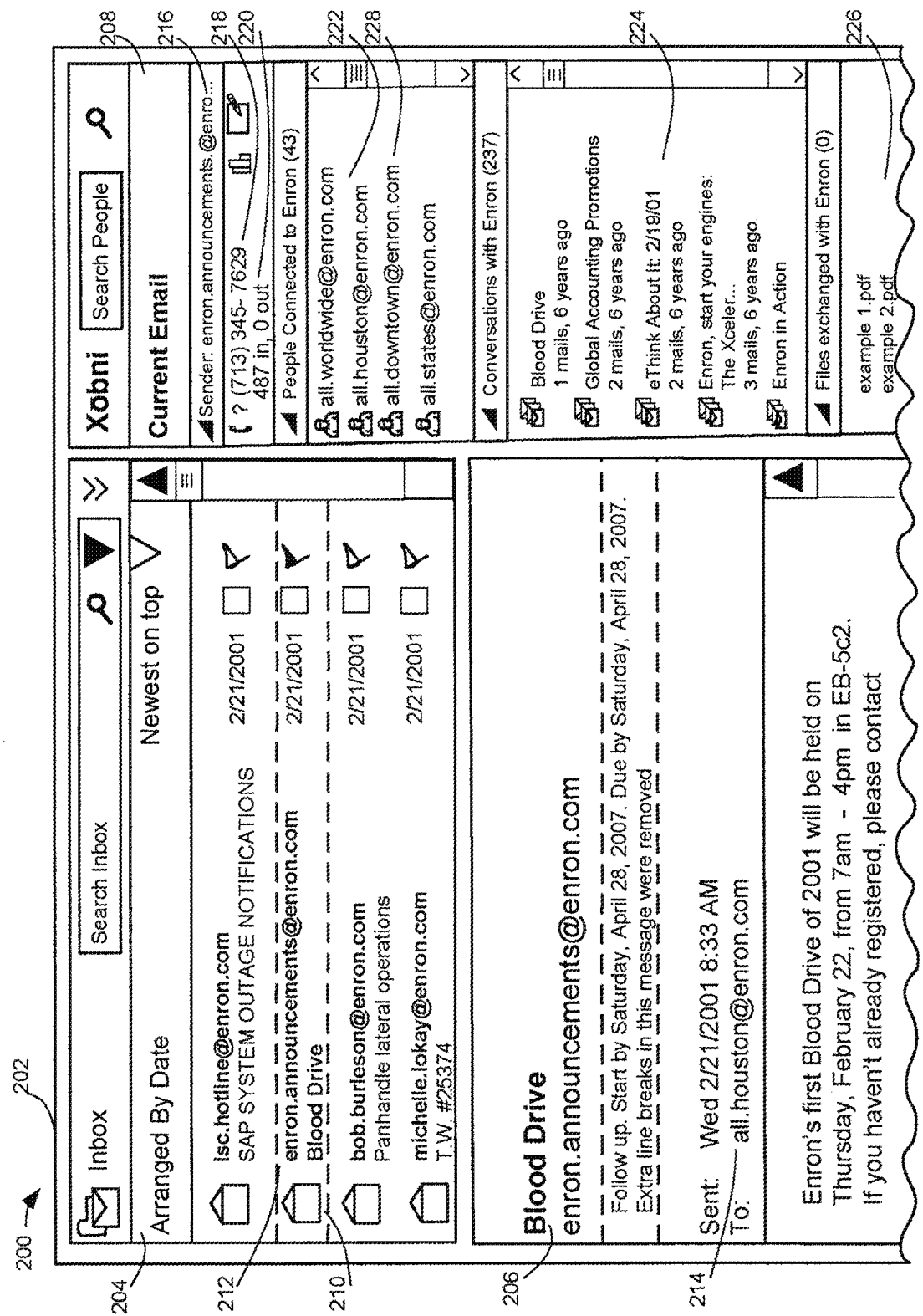
FIG. 2A shows an e-mail client with a person profile side bar.

An implementation of the address book 50 may be integrated in a communication system as described above. By way of example, the presentation of records associated with the address book 50 will be described below in greater detail in an e-mail system. Referring now to FIGS. 1 and 2A, the e-mail client 202 may include an inbox viewing panel 204 and an e-mail viewing panel 206. The e-mail client 202 may be a standard, stand alone e-mail client such as Microsoft Outlook® or Eudora®. In some implementations, the e-mail client 202 may be a web based e-mail client such as Yahoo! mail or G-mail that may be viewed using a web browser. The e-mail client 202 may allow a user to view a list of e-mails in the inbox viewing panel 204. The user may select an e-mail in the inbox viewing panel 204 causing the e-mail client 202 to display the selected e-mail in the e-mail viewing panel 206.

In some implementations, instead of an e-mail client, the system 100 may include an instant messaging client, a social network client, a text message client, or another communication viewing client. It is to be understood that while portions of this description describe systems and methods involving e-mail communications, these same systems and methods may be implemented using other forms of communication, including instant messages, phone calls, text messages, internet message board postings, social network messages or comments, or voice over IP communications.

The address book 50 may include a compilation of records including one or more person profiles 208. In the example depicted, a user interface associated with the address book 50 or an entry from the address book 50 (a person profile 208) may be displayed as an additional panel within the e-mail client 202 positioned to the right of the inbox viewing panel 204 and the e-mail viewing panel 206. This additional panel is sometimes referred to as a side bar. The additional panel may be located at the top, bottom, left side, or any other location within the e-mail client 202. In still some implementations, address book information may be displayed in a stand alone window, in a pop-up bubble displayed over a portion of the e-mail client 202, or integrated as part of one of the other viewing panels displayed by the e-mail client 202. For example, a pop up bubble containing a person profile 208 may be displayed when an e-mail is selected in the inbox viewing panel 204, when an e-mail address or portion of text in the e-mail viewing panel 206 is selected, when an entry is selected from an address book or when a mouse icon is moved over an e-mail address, name, icon, or portion of text.

A person profile 208 may contain information relating to a sender of an e-mail, a recipient of an e-mail, the body of an e-mail, an attachment to an e-mail, or a person or topic mentioned in an e-mail. In alternate implementations, the person profile 208 may contain information related to a sender, recipient, body, attachment or topic of another communication medium such as an instant message, a phone call, a text message, an internet message board, a social network message or comment, or a voice over IP communication. The user may implicitly request information to be displayed in the person profile 208 by selecting an e-mail in the inbox viewing panel 204 or selecting text within a header or body of an e-mail in the e-mail viewing panel 206. In some implementations, the profile may include additional information (e.g., derived information such as search results derived from a topic mentioned in a communication).

In some implementations, the person profile 208 may display information about an entity other than a person. For example, a communication may be received from an automated system, such as from a travel website, on-line retailer, an advertising service, or a mailing list. The person profile 208 may display information related to the sender of the communication. For example, if the communication received has been sent from a travel website, information related to the travel website, or other communications from the travel website may be displayed. In another example, if the communication received has been sent from an mailing list, information related to the mailing list, or other communications received from the mailing list may be displayed. As yet another example, if the communication received has been sent from a business entity, information about the business entity (e.g., address, telephone number, contact person name) may be included in the person profile 208.

For example, the user may select an e-mail 210 in the inbox viewing panel 204 causing the display of a person profile 208 that includes information related to a sender 212 of the e-mail 210. In another example, the user may select an e-mail address 214 or name of a recipient of the e-mail 210 (e.g., either by selecting the information while the information is being displayed with the e-mail or as part of the address book 50) in order to display information related to the recipient in a person profile 208. In another example, the user may select an attachment to the e-mail 210 in order to display information related to the attachment in the person profile 208. In yet another example, the user may select the name of a person, a user name of a person, or a particular topic listed in a header, a body, or an attachment of the e-mail 210 in order to display information related to the person or topic in the person profile 208.

In some implementations, the system 100 may determine if the user has made an implicit request to view information associated with a record in the address book 50 (e.g., in a specific person profile 208) by tracking, for example, user input of the form of mouse movements, mouse locations, keyboard strokes, mouse clicks, or active windows. Implicit requests to view information in the person profile 208 may include opening, viewing, reading or writing an e-mail or other communication medium. For example, if the user starts to compose an instant message, a record from the address book 50 (e.g., the person profile 208) associated with the recipient may be displayed including information related to the recipient of the instant message. In another example, if the user views a social network profile, either within the e-mail client 202 or in a separate web browser, the person profile 208 related to a person associated with the social network profile may be accessed and displayed.

In some implementations, the user may make a specific request to view information in the person profile 208 by accessing the address book 50, performing a search or clicking on a person's name.

In some implementations, the system 100 may be linked to a phone (e.g., voice over IP phone) used by the user. For example, the system 100 may include means for detecting when the user makes or receives a phone call or text message using the phone and display information related to a recipient or initiator of the phone call or text message in a person profile 208.

In the example depicted in FIG. 2A, the user has selected the e-mail 210 in the inbox viewing panel 204 and header information and a portion of the body of the e-mail 210 is displayed in the e-mail viewing panel 206. The e-mail 210 was received from the sender 212. The system 100 has determined that the user has made an implicit request to view information related to the sender 212 by selecting the e-mail 210. In response to this implicit request, the system 100 displays in a person profile 208 including information related to the sender 212.

In the example, the information displayed in the person profile 208 includes an e-mail address 216, a phone number 218, communication statistics 220, a contact network 222, a conversation list 224, and a file exchanged list 226. In some implementations, the person profile 208 may display additional contact information such as name, screen names, social network profile names, social network profile URLs, physical addresses, website URLs, additional e-mail addresses, or additional telephone numbers.

In the example, the communication statistics 220 include the number of e-mails received from the sender 212 and the number of e-mails sent to the sender 212. In some implementations, additional communication statistics 220 may be displayed, including times of communications, dates of communications, types of communications, volume of communications, length of communications, or speed of responses. For example, a statistic for the average amount of time it takes the sender 212 to respond to e-mails sent by the user may be displayed. In another example, the times of day that the sender 212 is most likely to respond to an e-mail or other form of communication may be displayed as a communication statistic 220. In another example, a statistic may be displayed that lists the percentage of communications between the user and the sender 212 that occur using a telephone, the percentage of communications that occur using instant messaging, the percentage of communications that occur using e-mails, or the percentage of communications that occur using a social network website as a percentage of all communications between the user and the sender 212. In another example, the number of communications sent or received on which the sender 212 has been copied may be displayed as a communication statistic 220. In another example, the number of communications received by the user on which the sender 212 has also been listed as a recipient may be displayed as a communication statistic 220.

In some implementations, the communication statistics 220 that are displayed may be chosen by the user (e.g., using management routine 54-4). The user may choose to have a default set of communication statistics displayed, or the user may select which individual communication statistics 220 are to be displayed. The user may choose to have the same set of communication statistics 220 displayed for each person profile 208 or the user may choose to have a different set of communication statistics 220 displayed depending on which person or topic the currently displayed person profile 208 is associated with.

The contact network 222 displayed in the person profile 208 shows a list of contacts 228 that are associated with the sender 212. In the example depicted, the contacts 228 are shown as e-mail addresses. In some implementations, the contacts 228 may be listed as names, screen names, nick names, employee numbers, social network profile names, social network profile URLs, telephone numbers, website URLs, or any combination of these.

In some implementations, details about a contact 228 may be displayed adjacent to the contact 228 in the contact network 222. These details may include time since last communication, last form of communication, frequency of communications, total numbers of communications, or other related data.

The contacts 228 listed in the contact network 222 are contacts that are associated with the person profile, and in this case, associated with the sender 212. The contacts 228 may include recipients of communications from the sender 212, recipients of communications of which the sender 212 is also a recipient, individuals named in a body or header of a communication with the sender 212, or individuals named in a document that is attached to a communication with the sender 212. For example, a person who was copied on an e-mail between the user and the sender 212 may be listed as a contact 228 in the contact network 222. In the example depicted, the header of the e-mail 210 as shown in the e-mail viewing panel 206 lists all.houston@enron.com as a recipient of the e-mail 210. The contact network 222 lists all.houston@enron.com as a contact 228 of the sender 212. In another example, if the user receives an e-mail from the sender 212 with the subject line "Matt Smith's birthday party", Matt Smith may be listed as a contact 228 in the contact network 222 even if Matt Smith has never been included in or been the recipient of any communications between the user and the sender 212. In another example, if the user posts a comment to a social network profile page belonging to the sender 212 and a person named Eric Johnson has also posted a comment to the social network profile page, or is listed as a friend of the sender 212 on the social network profile page, Eric Johnson may be listed as a contact 228 in the contact network 222.

In some implementations, the contacts 228 listed in the contact network 222 may be collected from sources other than communications between the user and the sender 212. In one implementation, the sender 212 may provide a list of contacts to the user to include in the contact network 222 for the sender 212. The sender 212 may provide the list of contacts to the user through sharing the list of contacts on a shared network, or by sending a communication to the user with, for example, the list of contacts in a body of the communication or in an attachment to the communication. Management routine 54-4 may facilitate the collection, receipt and posting of contacts in a person profile.

In some implementations, the address book 50 may collect data from outside sources in order to determine contacts 228 to be listed in the contact network 222. The address book 50 (e.g., using the record data routine 54-2) may query various sources to extract information on contacts that may be associated with the sender 212 and listed in the contact network 222. Sources of information that may be queried to derive contacts associated with the sender 212 may include web search engines, people search engines, social networks, personal web pages, telephone directories, scanned business card data or company website profiles.

For example, the address book 50 may perform a search of a social network based on the sender 212's name, e-mail address, screen names or other information about the sender 212. The address book 50 may then identify a profile page on the social network belonging to the sender 212. Any contacts that are publicly listed on the social network profile page may be listed in the contact network 222 of the sender 212 even if the user has never communicated with the sender 212 using the social network or viewed the profile page of the sender 212 on this social network. In some implementations, the address book 50 may access and extract contacts listed on a private social network profile page belonging to the sender 212 if the user has proper access information or authorization to view the private social network profile page of the sender 212.

In another example, the address book 50 may use a search engine to perform a search based on the sender 212's name, e-mail address, screen names or other information about the sender 212 in order to identify web pages that may contain contacts that may be associated with the sender 212. For example, the address book 50 may use a search engine to perform a search based on the sender 212's name. If one of the search results returned is for a blog written by a person named Mark Adams that mentions the sender 212, then Mark Adams may be listed as a contact 228 in the contact network 222. In another example, the address book 50 may determine that the sender 212 works for the same company as a person who has sent a different communication to the user. This person may then be listed as a contact 228 of the sender 212. In some implementations, the address book 50 may collect data using a peer to peer network.

Information that may be used to collect information about contacts 228 or other information displayed in the person profile 208 may include e-mail addresses, names, screen names, social network profile names, phone numbers, personal website URLs, social network profile URLs, or physical addresses.

The contacts 228 displayed in the contact network 222 may be listed in order based on a ranking system. Criteria used to rank the contacts 228 may include total volume of communication, volume of communication over a period of time, length of communications, importance level of communications, types of communications, contents of communications, time of communications; methods by which the contacts 228 were determined to be associated with the sender 212, or any combination of these. For example, the contacts 228 may be ranked based on the total number of communications between the user and the sender 212 for which a contact is also a recipient of the communication. In another example, the contacts 228 may be ranked based on the number of communications between the user and the sender 212 for which a contact is also a recipient of the communication over the course of the last three weeks. In another example, the contacts 228 may be ranked based on the number of communications between the user and a contact for which the sender 212 is also a recipient of the communication.

In another example, the contacts 228 may be ranked based on the length of communications between the user and the sender 212 for which a contact is also a recipient of the communication with longer communications being ranked higher than shorter communications. In another example, contacts that are listed on communications flagged as urgent or important may be ranked higher than other contacts. In another example, the user may choose to have contacts who mainly communicate with the user or sender 212 using e-mail ranked higher than contacts who mainly communicate with the user or sender 212 using instant message or social networks. In another example, the address book 50 may use the contents of communications involving each contact 228 and the sender 212 to determine if communications involving the contact 228 and the sender 212 are primarily business related or social related communications. The address book 50 may then give a higher ranking to contacts associated with business communications than contacts associated with social communications.

In another example, contacts who are associated with more recent communications between the user and the sender 212 may be ranked higher than contacts associated with older communications between the user and the sender 212. In another example, contacts that have been determined to be associated with the sender 212 based on e-mail communication may be ranked higher than contacts that have been determined to be associated with the sender 212 based on web searches.

In some implementations, each contact 228 listed in the contact network 222 may be a link to more information about the contact 228. For example, if a contact 228 is clicked on, selected, or interacted with by the user, a person profile containing information about the selected contact 228 may be displayed. In another example, the user may hover a mouse cursor or other selection tool over a contact 228. This may cause a pop-up bubble containing additional information about the contact 228 to be displayed.

The conversation list 224 may display a list of recent communications between the user and the sender 212 or involving the user and the sender 212. The communications displayed on the conversation list 224 may be a list of past e-mails, text messages, instant messages, telephone calls, social network communications, message board posts or voice over IP communications involving the sender 212. In some implementations, the conversation list 224 may be a list of recent conversation threads involving the sender 212. A conversation thread is a series of communications that may be grouped together. For example, a series of e-mails having the same or similar subjects may be grouped together as a conversation thread. In another example, a group of instant messages between the sender 212 and the user that occurred over a specific period of time may be grouped together as a conversation thread. For example, if the user sent and received a series of instant messages from the sender 212 over a three hour period earlier in the day, and that conversation was separated from another series of instant messages between the user and the sender 212 by a period of 2 hours, the instant messages that were sent and received during that three hour period may be grouped together as a conversation thread. In another example, a series of telephone calls between the user and the sender 212 that occurred during a set time period may be grouped together as a conversation thread.

The communications or conversation threads displayed in the conversation list 224 may be listed in order based on a ranking system. In one implementation, conversation threads may be listed in order of most recent communications to oldest communications. In some implementations, conversation threads may be listed in order of oldest to most recent. In some implementations, conversation threads may be listed in order of importance with conversation threads containing communications marked as urgent being ranked higher than conversation threads with fewer communications marked urgent or no communications marked urgent.

In some implementations, the address book 50 may determine which conversation threads are work related and which conversation threads are social. The conversation threads that are work related may then be ranked higher than the conversation threads that are social. In some implementations, conversation threads may be ranked based on the number of communications in the conversation thread.

Communications that are listed in the conversation list may include communications initiated by the sender 212, communications for which the sender 212 is a recipient, communications on which the sender 212 has been copied, or communications in which the sender 212 is mentioned.

In the example depicted in FIG. 2A, the conversation list 224 displays a list of recent conversation threads involving the user and the sender 212. The conversation threads displayed are for recent e-mail communications involving the user and the sender 212. The e-mails in each conversation thread are grouped by subject. The conversation list 224 displays the subject for each conversation thread, the number of e-mails in each conversation thread, and the amount of time that has passed since the last communication for this conversation thread was sent or received. In some implementations, additional information may be displayed for each conversation thread, including: time and date of the last communication in the conversation thread, time and date of the first communication in the conversation thread, other contacts involved in the conversation thread, average length of communications in the conversation thread, total number of people involved in the conversation thread, level of importance of the communications in the conversation thread, attachments shared in the conversation thread, calendar events related to the conversation thread, other forms of communication related to the conversation thread, relevant web data, or average response time of communications in the conversation thread.

In some implementations, the conversation list 224 may display a summary or the first few lines of the most recent communication for each conversation list. In some implementations, the conversation list 224 may display a summary or the first few lines of the first communication for each conversation list. In some implementations, the conversation list 224 may display a summary or the first few lines of the last communication initiated by the sender 212 for each conversation list.

The files exchanged list 226 displays a list of files that were attached to communications involving the user and the sender 212. This may include communications initiated by the user for which the sender 212 was a recipient, communications initiated by the sender 212 for which the user was a recipient, or communications initiated by a third party for which the sender 212 and the user were both recipients. The files exchanged list 226 may also include files that were exchanged between the user and the sender 212 without using a communication medium. For example, the files exchanged list 226 may include files that were transferred from the sender 212's network drive to the user's computer or network drive. In another example, the files exchanged list 226 may include files that were transferred to the user's computer or network drive from an external hard drive, flash drive, or floppy disk belonging to or populated by the sender 212.

The files displayed in the files exchanged list 226 may be listed in order based on a ranking system. In one implementation, files may be listed in order of most recently received files to least recently received files. In some implementations, files may be listed in order of oldest to most recent. In some implementations, files may be listed in order of importance, with files that were attached to communications marked as urgent being ranked higher than files attached to communications that were not marked as urgent. In some implementations, the address book 50 may determine which files are work related and which files are personal. The files that are work related may then be ranked higher than the files that are personal. In some implementations, files may be ranked based on the size of the files.

In some implementations, files may be ranked in order of most recently modified to least recently modified. In some implementations, files may be ranked based on creation date of the files. In some implementations, files may be ranked based on the authors of the files. In some implementations, files may be ranked based on recent activity of communication threads associated with the files. For example, a first file that was sent as an attachment to a communication in a communication thread for which the most recent communication occurred today may be ranked higher than a second file that was sent as an attachment to a communication in a communication thread for which the most recent communication occurred three days ago, even if the first file was sent before the second file.

In some implementations, the files displayed in the files exchanged list 226 may be grouped together. The files may be grouped together based on the subject of the communications to which the files were attached, file name, file title, date of the file, date of the communication, file type, or subject matter of the file. For example, if a document has undergone several rounds of revisions, the different versions of the document may be grouped together so that the different versions of the document may be easily compared to one another. In another example, a number of files about rain forests may be grouped together since they all contain related subject matter. In another example, all image files may be grouped together so that they may be more easily viewed, or easily put into a slide show. For example, a group of image files may be displayed as a slide show and each slide may contain additional information about the image being displayed, such as who sent the image, recipients of the image, the date the image was sent or received, or other information drawn from one or more communications to which the image was attached.

In some implementations, the person profile 208 may include additional information about a selected e-mail. For example, a routine may extract information from the e-mail 210 and use this information to gather and display data from websites, search engines, or other sources of information. For example, the e-mail 210 may contain information about travel arrangements. The e-mail 210 may be an e-mail from an airline, travel agent, travel website or other source. If the e-mail 210 contains information about a flight, such as a flight number, an airline, a departure time, an arrival time, a departure city, or an arrival city, a routine may use this information to query search engines or travel websites for information about the flight. This information may include expected departure time, expected arrival time, expected delays, weather in the destination city, weather in the departure city, or any changes to the flight. This information may then be displayed as part of the person profile 208. This allows the user to see when changes to travel arrangements have occurred, and easily contact a travel company or airline in order to correct the situation.

In another example, the e-mail 210 may contain information about a purchase from an on-line retailer. The e-mail 210 may contain shipping information, shipping status, or order information. If the e-mail 210 contains a shipping number for the shipment of a recently purchased item, a routine may query a search engine or shipping web site to extract information about the current status and expected arrival of the item. This information may then be displayed as part of the person profile 208.

In another example, the e-mail 210 may contain information about an item or service that the user is interested in purchasing. A routine may query one or more search engines, websites, or on-line retailers to determine which retailer or website has the best price or currently has the item in stock or the service available. This information may then be displayed as part of the person profile 208.

Figure 2B:
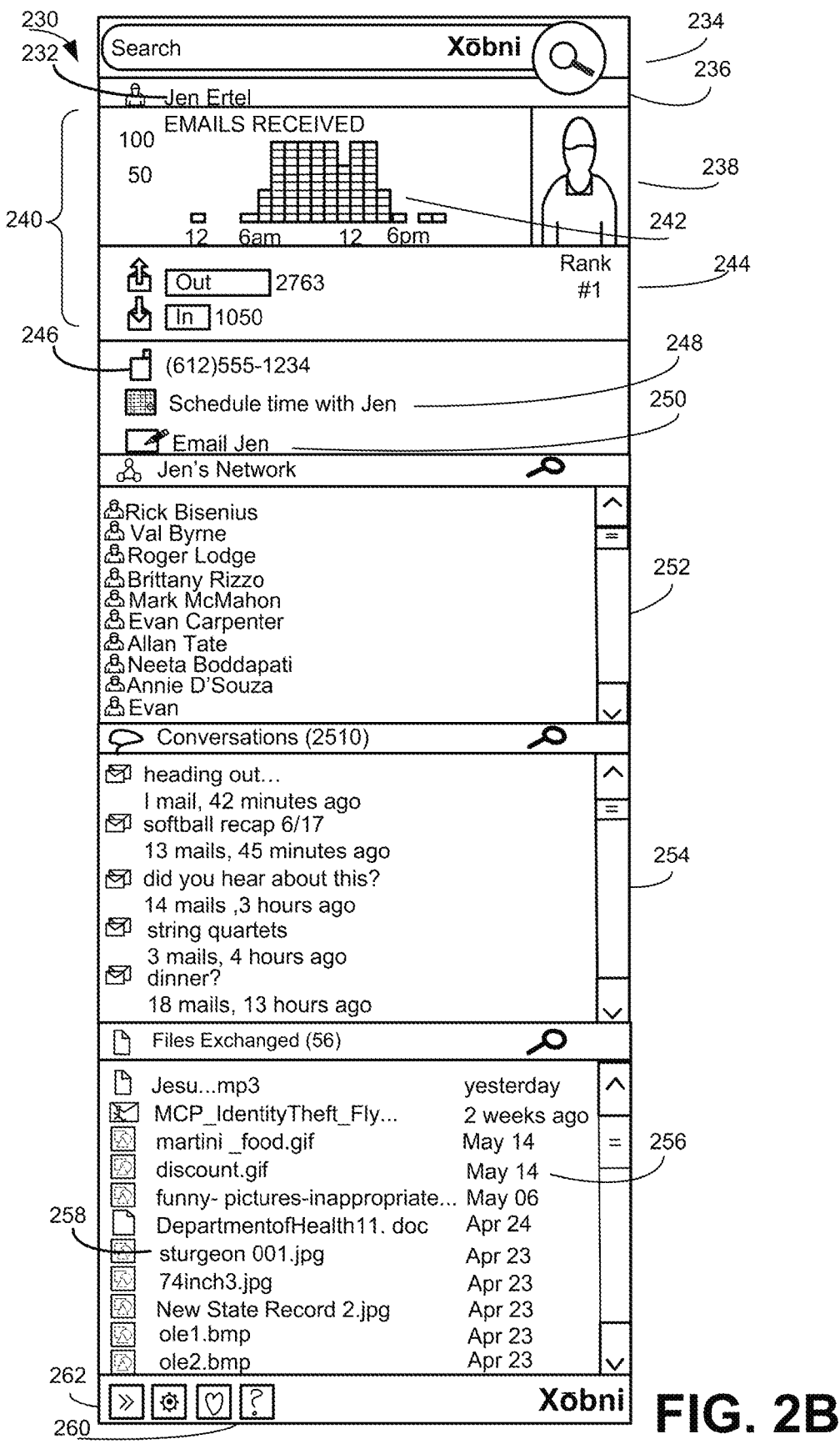
FIG. 2B shows an example of a person profile.

FIG. 2B shows a person profile 230 for a person 232 named "Jen Ertel". The person profile 230 for the person 232 may be displayed in response to an action by a user that indicates either an implicit or direct request to view the person profile 230 of the person 232. Actions by the user that may cause the person profile 230 for the person 232 to be displayed may include viewing or selecting a communication sent by the person 232, viewing or selecting a communication for which the person 232 is listed as a recipient, composing or initiating a communication with the person 232, selecting or clicking on a name, screen name, or e-mail address of the person 232, opening the address book 50 and selecting a person (e.g., Jen Ertel) or performing a search for information related to the person 232.

The person profile 230 includes a search bar 234. The search bar 234 may be used to request that information be displayed about a particular person, topic, conversation thread, communication, or file. For example, a search performed using the search bar 234 and the search string "Allan Tate" may result in a person profile for a person named Allan Tate being displayed. In another example, a search using the search string "sundaypresentation.ppt" may result in information about a file named "sundaypresentation.ppt" being displayed. In another example, a search using the search string "2002 Sales Goals" may result in information to be displayed regarding communications with the subject "2002 Sales Goals", containing the phrase "2002 Sales Goals", or having attachments that contain the phrase "2002 Sales Goals".

Search criteria that may be used to identify a person profile may include names, screen names, social network profile names, social network profile URLs, physical addresses, website URLs, e-mail addresses, e-mail subject lines, file names, or telephone numbers. For example, a search using the search string "allan.tate@example.com" may result in a person profile for a person named "Allan Tate" being displayed. In the example depicted in FIG. 2B, a search for the phone number "(612) 555-1243" may have been performed in-order to display the person profile 230 for the person 232 named "Jen Ertel".

The person profile 230 may include a title bar 236. The title bar 236 may display a name, a nick name, a screen name, a primary e-mail address, or other identifying title for the person 232 so that the user may easily identify who the information in the person profile 230 is related to.

The person profile 230 may also include an image 238. The image 238 may be a picture of the person 232 to help the user more easily identify who the information in the person profile 230 is related to or to help the user identify whom he or she is communicating with. For example, if the user receives an instant message from a person with the screen name "summergirl" the user may not be able to remember who this screen name belongs to. When the instant message is received, the person profile 230 may display information about the person with the screen name "summergirl" including a picture of the person as the image 238. This may help the user to identify whom he or she is communicating with. The image 238 may also be an image, icon, or picture associated with the person 232. The image, icon, or picture may be used to identify the person 232 as a business contact, co-worker, friend, social acquaintance, client, or contractor. For example, all of the person profiles 230 for contacts from a particular company may display a logo for that company. This may help the user to quickly identify what relationship he or she has with these particular contacts.

The image 238 may be added to the person profile 230 by the user, or it may be automatically extracted from a communication with the person 232 or from a website or profile page belonging to or about the person 232. For example, if a social network screen name or URL for the person 232 is known, an image from the person 232's social network profile page may be extracted and used as the image 238. In another example, if instant message communications with the person 232 include an icon that identifies the person 232, this instant message icon may be extracted and used as the image 238.

The person profile 230 may include communication statistics 240 about communications involving the person 232. These communication statistics 240 may include the statistics as previously described for FIG. 2A. In the example shown in FIG. 2B, one of the communication statistics 240 displayed is a graph 242 showing what times of day communications are received from the person 232 and the relative volume received from the person 232 at each time of day. This may help the user to determine when, or how quickly the person 232 will respond to a new communication from the user. For example, if the user lives in the United States and the person 232 lives in Germany, most of the communications received from the person 232 may occur between 5:00 am and 10:00 am of the user's local time. The graph 242 may easily display this information so that the user may determine when to reasonably expect a response to a recent communication from the person 232.

Other communication statistics 240 displayed in the person profile 230 in FIG. 2B include the total number of communications received from the person 232, the total number of communications sent to the person 232, and a rank 244. The rank 244 may be the rank of the person 232 compared to all other persons that the user communicates with. The rank 244 may be based, for example, on total communications exchanged, total number of attachments exchanged, total number of communications sent, total number of communications received, length of communications or importance of communications.

Communication statistics 240 may be displayed as graphs or charts as shown in FIG. 2B, or as text. In some implementations, statistics may be displayed in the person profile 230 or in an additional panel or pop-up window as "fun facts". For example, when viewing a person profile for someone named "Matt Miller", the person profile may display a message that reads "Matt's birthday is next week". In another example, a pop-up bubble with the message "Your last communication with Matt was 21 days ago" may be displayed. In another example, a panel may display a message reading "You send Matt 20 times as many messages as he sends you."

Another example of a fun fact that may be displayed is "Matt is your $5^{th}$ most e-mailed contact". Another example of a fun fact that may be displayed is "your most e-mailed contact is Steve.'. Another example of a fun fact that may be displayed is "the fastest responder to your communications is Garrett." The fun facts may include any combination of communication statistics, communication information, contact information, or contact statistics.

In some implementations, communication statistics 240 may be shared with other persons. For example, the user may choose to share communication statistics with the person 232. The person 232 will then be able to view communication statistics 240 about his or her communications with the user. In some implementations, the user may indicate that one or more persons are trusted contacts. Communication statistics 240 may be automatically shared with all persons indicated as trusted contacts. Other information, such as calendar information, contact information, or contact network information may also be shared with trusted contacts.

The person profile 230 may include contact information 246. The contact information 246 displayed may include e-mail addresses, telephone numbers, screen names, social network profile names, social network profile URLs, physical addresses, facsimile numbers, or website URLs. The contact information 246 may be collected from a variety of sources including communications between the person 232 and the user, communications between the user and other persons, e-mail body text, e-mail meta data, e-mail header information, e-mail attachments, web search engines, people search engines, social networks, e-mail clients, instant messages, personal web pages, telephone directories, scanned business card data, text messages, picture sharing websites, video sharing websites, person profile pages, telephone communications, or customer relationship management systems. For example, when the user receives an e-mail from a person, that person's e-mail address may be added to the list of contact information 246 for that person's person profile 230. In another example, when the user makes a phone call to a person, that person's telephone number may be added to the list of contact information 246 for that person's person profile 230.

In some implementations, contact information 246 may be extracted from the body, subject, or meta data of a communication between the user and the person 232. For example, if the user receives an e-mail from the person 232 with a signature block at the end that includes a telephone number, facsimile number, and screen name for the person 232, this contact information may be extracted from the e-mail and added to the list of contact information 246 for the person 232's person profile 230. In another example, an e-mail from a person may include an address for the person in the body of the e-mail or in an attachment to the e-mail, this address may be extracted from the e-mail or attachment and added to the list of contact information 246 for that person's person profile 230. In another example, the person 232 may leave a social network post for the user telling the user the person 232's instant message screen name, this screen name may be added to the list of contact information 246 for the person 232's person profile 230.

In some implementations, contact information 246 for the person 232 may be extracted from a communication from a third party. For example, the user may receive an e-mail from Bill that contains the text "Mary's cell phone number is 608-555-5353". This phone number may be extracted from Bill's e-mail and added to the list of contact information 246 for Mary's person profile 230. In another example, the user may receive an e-mail with an attachment that contains a list of telephone numbers, e-mail addresses, and office numbers for everyone in the user's office. The telephone number, e-mail address, and office number for each person listed on the attachment may be extracted and added to the list of contact information 246 for the person profiles 230 of each person listed on the attachment.

Contact information 246 may be extracted from multiple sources, including multiple e-mail clients, multiple web mail systems, multiple instant message clients, multiple telephone numbers, multiple social networks, or multiple web pages.

In some implementations, contact information 246 may be collected using search engines, telephone directories, or people search engines. Search criteria may include e-mail addresses, names, screen names, social network profile names, phone numbers, personal website URLs, social network profile URLs, facsimile numbers or physical addresses. For example, a search of a telephone directory or people search engine for "Rex Banner" may return a telephone number for Rex Banner. This telephone number may then be added to the list of contact information 246 for Rex Banner's person profile 230. In another example, a people search or web search for the e-mail address "alewis@example.com" may return a URL for a social network profile for Adam Lewis. The name "Adam Lewis" may then be associated with the e-mail address "alewis@example.com" in a person profile 230. In addition, the social network profile URL and social network screen name for Adam Lewis may be added to the list of contact information 246 for Adam Lewis's person profile 230. Furthermore, additional contact information, that is listed on the social network profile for Adam Lewis, such as additional e-mail addresses, phone numbers, instant message screen names, etc., may be extracted from the social network profile and added to the list of contact information 246 for Adam Lewis's person profile 230.

In another example, a web search or person search for a person may return a photo or video sharing website profile for the person. The URL or screen name for the person's photo or video sharing website profile may be added to the list of contact information 246 for the person's person profile 230. In addition, the photo or video sharing website may contain additional contact information for the person that may be extracted and added to the list of contact information 246 for the person's person profile 230.

In another example, contact information 246 for the person 232 may include an e-mail address "jertel@examplecompanyltd.com". A web search may be performed to identify the website associated with the e-mail extension "examplecompanyltd.com". For example, this e-mail extension may be associated with a company called "Example Company ltd.". The website for Example Company ltd. may then be searched for information about the person 232. The website may include a profile page for the person 232 that includes contact information that may be added to the list of contact information 246 for the person 232's person profile 230. In addition, the URL for the profile page may be added to the list of contact information 246 for the person 232's person profile 230.

In some implementations, the address for a person may be used to refine the search results for that person by constricting the results to information about persons in a specific geographic area. For example, if a search is being performed for information on a person with a common name, such as "Bill Johnson", and Bill Johnson's address is known, the search results may be refined by restricting the results to information about person's named Bill Johnson in the city of the known address. In some implementations, other information about a person may be used to refine search results for that person.

In some implementations, contact information may be extracted from a shared network drive or through a secure connection. In some implementations, contact information may be automatically shared between systems. For example, the person 232 may elect to share contact information with all people in a trusted network, such as all people with e-mail extensions from the same company. A computer belonging to the person 232 may then automatically send contact information to all trusted people. If the user is in the network of trusted people, the person 232's contact information will automatically be shared with a computer or system belonging to the user.

In some implementations, contact information for the person 232 may be manually added or removed from the address book 50 or an individual person profile 230 by the user. In some implementations, contact information for the person 232 may be manually added or removed from the person profile by the person 232 or by a third party. In some implementations, the user may choose which contact information for each person is displayed in that person's person profile.

In some implementations, when a mouse cursor or other selection tool is hovered over/indicates a piece of contact information in the list of contact information 246, a pop-up bubble or other indicator may be displayed which indicates the source from which the piece of contact information was received or extracted. For example, if a phone number has been extracted from an e-mail, a hover bubble may be displayed which shows the e-mail or a portion of the e-mail where the phone number was extracted with the extracted info highlighted or demarcated in some way.

In some implementations, the user may be allowed to validate contact information in the list of contact information 246. Validated contact information may be indicated as validated, and un-validated contact information may be indicated as un-validated. For example, if a phone number for the person 232 is extracted from an e-mail, the user may look at the phone number to determine if it is indeed the correct phone number for the person 232. If the user believes that the phone number is correct, the user may choose to validate the phone number. The phone number may then be displayed along with an indication that it has been validated, such as with a check mark icon, or text that reads "valid". If the user is unsure if the phone number is correct, or has not taken the time to validate the phone number, the phone number may be displayed with an indication that it has not been validated, such as with a question mark icon, or the text "not validated".

In some implementations, presence of the person 232 may be indicated for some or all of the contact information on the list of contact information 246. For example, an indicator next to a person's instant message screen name may indicate if the person is currently logged onto the related instant message network. In another example, an indicator next to a person's social network screen name or URL may indicate if the person is currently logged onto the related social network or if the person has made a recent update to his or her social network profile. In another example, an indicator next to a person's e-mail address may indicate if the person has put up an away message or out of the office message.

In some implementations, the person profile 230 may display information about the person 232's current location. If the person 232 is in possession of a GPS unit, GPS enabled phone, or other location detection device, the person 232 may choose to share his or her location information. There are several services that allow a person to share location information with other people. The person 232 may choose to share his or her location information with the user. The person profile 230 may then display the current location of the person 232. This location information may be displayed as an address, map coordinates, or a graphic of a map with an icon to indicate the person 232's present location.

Other information about the person 232 that may be displayed on the person profile 230 may include birthday, gender, age, job title, employer, universities attended, family information, or other biographical data. Information from Customer Relationship Management Systems (CRMs) about or related to the person 232 may also be displayed in the person profile 230. Information about calendar items or scheduled meetings related to the person 232 or related to a communication may also be displayed as part of the person profile 230.

In some implementations, information from one or more websites may be displayed as a chronological feed of information in the person profile 230. This information may be queried on the web via one or more search engines or from one or more specific websites through established associations between the person 232 and the one or more websites. For example, this information may be found by general searching, people searching, or querying websites where it has been established that the person 232 is generating content or is the subject of content on the website. Search terms for these searches may include e-mail addresses, names, screen names, social network profile names, phone numbers, personal website URLs, social network profile URLs, or physical addresses. Information that is extracted from communications with the person 232 may also be used as search criteria.

The person profile 230 may include a schedule time link 248. The user may click on/interact with the schedule time link 248 to send a communication to the person 232 to request a meeting or to send the user's schedule to the person 232. For example, clicking on the schedule time link 248 may cause an e-mail to be automatically composed that is addressed to the person 232 that contains all of the times over the course of the next week that the user is available during business hours. This schedule information may be extracted from a calendar associated with an e-mail client, web mail account, social network account, instant messaging program, telephone, personal digital assistant (PDA), or website belonging to the user or associated with the user. In addition, schedule information may be extracted from a calendar stored on a computer, network drive, or other data storage location belonging to or associated with the user. In one implementation, clicking on the schedule time link 248 may cause a communication to be sent to the person 232 requesting schedule information from the person 232.

The person profile 230 may also include one or more initiate communication links 250. In the example shown in FIG. 2B, the initiate communication link 250 displayed will cause an e-mail addressed to the person 232 to be automatically generated when it is clicked on. Other forms of communication that may be initiated using an initiate communication link 250 include telephone calls, instant messages, text messages, social network messages, social network posts, message board posts, facsimiles, or voice over IP communications. For example, the person profile 230 may include a "call Jen" link that may cause the user's cell phone to dial Jen's phone number when clicked on. In another example, the person profile 230 may include an "instant message" link that when clicked on, may cause an instant message program to automatically open and generate an instant message addressed to a screen name of the person 232.

The person profile 230 may include a contact network 252. The contact network 252 may include a list of contacts associated with the person 232. The contact network 252 may be populated using the methods previously described in the description of FIG. 2A. The person profile 230 may also display the total number of contacts associated with the person 232 in the contact network 252. In the example shown in FIG. 2B, the contact network 252 displayed in the person profile 230 indicates that there are 50 contacts in Jen's contact network 252.

Clicking on, selecting, or interacting with one or more contacts from the contact network 252 may cause one or more actions to occur. In one implementation, selecting a contact from the contact network 252 may cause a person profile for that contact to be displayed. In some implementations, selecting one or more contacts from the contact network 252 may cause a communication directed to the selected contacts to be initiated. For example, selecting three contacts from the contact network 252 may cause an e-mail addressed to the three contacts to be generated. In another example, clicking on three contacts from the contact network 252 may cause the user's telephone to initiate a conference call with the selected contacts. In some implementations, selecting one or more contacts from the contact list may cause a communication directed to the selected contacts and the person 232 to be generated.

In some implementations, selecting a contact from the contact network 252 may cause the most recent communication or conversation thread between the user and the selected contact to be displayed. In some implementations, selecting a contact from the contact network 252 may cause the most recent communication or conversation thread involving the contact, the person 232, and the user to be displayed. In some implementations, moving a mouse cursor over a contact in the contact network 252 may cause information about the contact to be displayed. For example, moving a cursor over a contact may cause a small pop-up bubble to appear that displays the contact's phone number, e-mail address, or other contact information. In some implementations, contacts may be manually added or removed from the contact network 252 by the user.

The person profile 230 may include a conversation list 254 that includes a list of recent communications or conversation threads involving the user and the person 232 as previously described in the description of FIG. 2A. The conversation list 254 may display the total number of communications or conversation threads involving the user and the person 232. In the example shown in FIG. 2B, the conversation list 254 indicates that 2510 conversation threads have occurred that involved the user and the person 232.

Clicking on or selecting a conversation thread or communication in the conversation list 254 may cause a more detailed summary of the conversation thread or communication to be displayed. For example, selecting a conversation thread may cause a summary of one or more communications in the conversation thread to be displayed. In another example, selecting a communication in the conversation list 254 may cause a summary of the communication to be displayed. In some implementations, selecting a communication in the conversation list 254 may cause the communication to be displayed. For example, selecting an e-mail from the conversation list 254 may cause the e-mail to be displayed.

In some implementations, selecting a conversation thread may cause the most recent communication to be received or the most recent communication to be sent in that conversation thread to be displayed. In some implementations, selecting a conversation thread in the conversation list 254 may cause the first communication in that conversation thread to be displayed. In some implementations, selecting a conversation thread from the conversation list 254 may cause a communication addressed to all of the participants of the conversation thread to be generated. For example, selecting an e-mail conversation thread may cause an e-mail to be automatically generated that is addressed to all of the e-mail addresses involved with the selected conversation thread. In some implementations, communications or conversation threads may be manually added or removed from the conversations list 254 by the user.

The person profile 230 may include a files exchanged list 256. The files exchanged list 256 may contain a list of files exchanged between the user and the person 232 as previously described in the description of FIG. 2A. For each file listed in the files exchanged list 256, the person profile 230 may display a file name, a file title, an icon, the time or date when the file was received, the amount of time that has elapsed since the file was received, the subject of the communication to which the file was attached, or other information about the file. Icons displayed next to a file name or file title may indicate what type of document the file is. In the example depicted, a file 258 with the file name "sturgeon 001.jpg" is displayed. An icon next to the file name for the file 258 indicates that the file 258 is a picture file. A date next to the file name indicates that the file 258 was received on April 23.

Clicking on or selecting a file in the files exchanged list 256 may cause the file to open. In some implementations, selecting a file may cause the communication to which the file was attached to be displayed. In some implementations, selecting a file may cause a list of files with the same file name to be displayed. This allows the different versions of a document that has undergone several rounds of revisions to be reviewed and compared to each other. This list of files may include a time and date stamp for each version of the file so that the most recent revision may be easily identified. In some implementations, selecting a file may cause a summary of the file to be generated and displayed. For example, hovering a cursor over a file in the files exchanged list 256 may cause an information bubble containing the title and first few lines of the file to be displayed. In some implementations, files may be copied from the files exchanged list 256 to other locations. In some implementations, files may be manually added or removed from the files exchanged list by the user.

The person profile 230 may include one or more menu buttons 260. The menu buttons may be used to change personal settings or preferences, change viewing preferences, or access menus or help information. The person profile 230 may also include a minimize button 262 that may cause the person profile 230 to minimize or close. When the minimize button 262 is clicked or selected, a minimized version of the person profile 230 that takes up less space in a viewing window may be displayed. The minimized version of the person profile 230 may include a summary of some or all of the information displayed by the person profile 230.

Figure 2C:
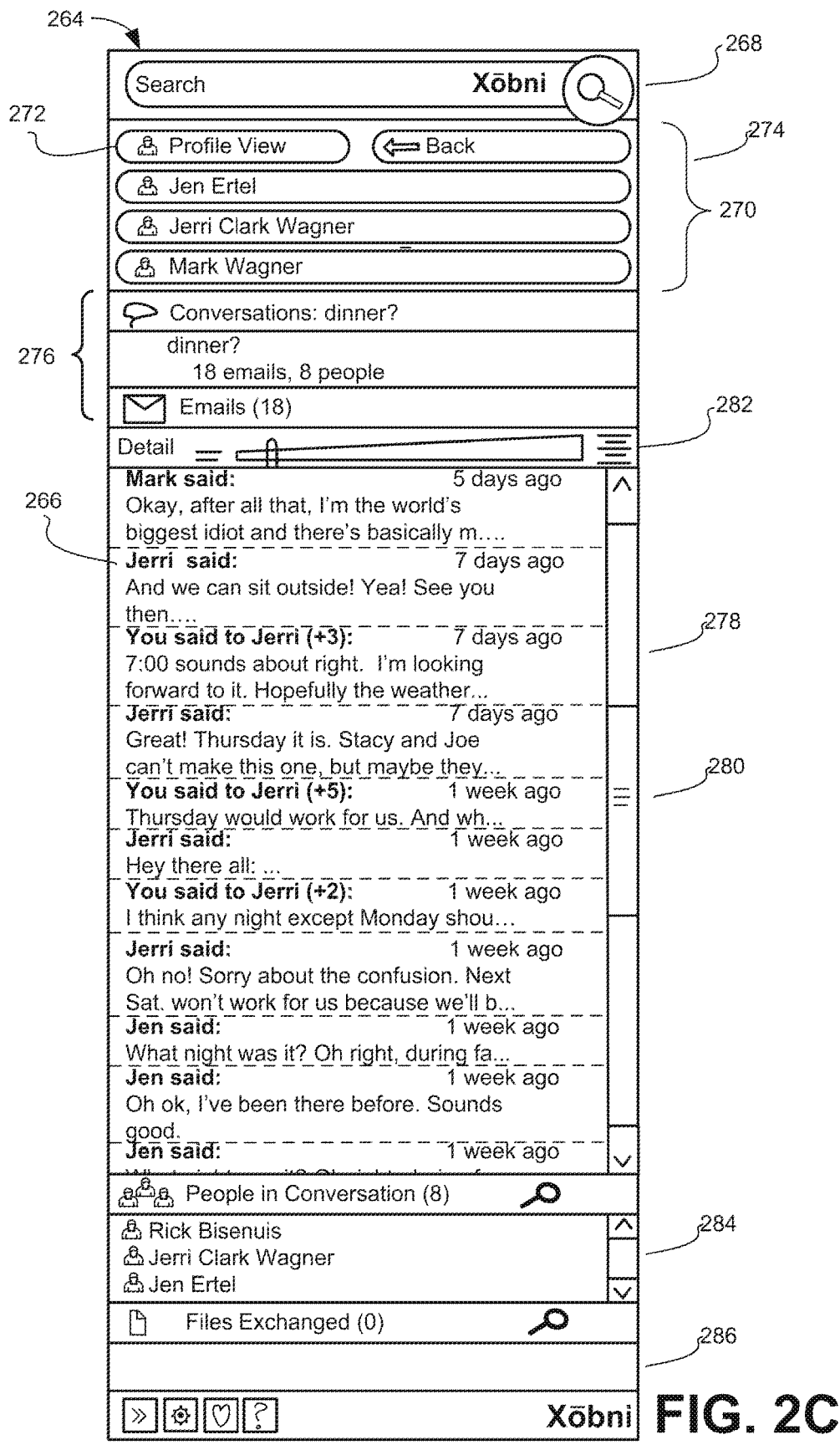
FIG. 2C shows an example of a conversation thread profile.

FIG. 2C shows a viewing panel 264. The viewing panel 264 may display a person profile such as the person profile 230 of FIG. 2B. The viewing panel 264 may also display information about communications, communication attachments, files, or conversation threads. In the example shown in FIG. 2C the viewing panel 264 displays information about a conversation thread 266. The information about the conversation thread 266 may be displayed in response to a user clicking on a conversation thread 266 in a conversation list, such as the conversation list 254 from FIG. 2B. The conversation thread 266 may also be displayed in response to the user viewing, reading, selecting, opening, or writing a communication that is part of the currently displayed conversation thread 266. In some implementations, the conversation thread 266 may be displayed in response to a search performed by the user. For example, the user may use a search bar 268 to search for a conversation thread 266 based on the subject of the conversation thread 266, participants in the conversation thread 266, files attached to communications in the conversation thread 266, or key words or terms in the communications of the conversation thread 266.

The viewing panel 264 may include one or more navigation buttons 270. The navigation buttons 270 may include a profile view navigation button 272. The profile view navigation button 272 may be used to return the viewing panel 264 to a profile view so that the viewing panel 264 displays information about the sender or recipient of a currently selected communication, or another person as indicated by the user. The navigation buttons 270 may also include a back button 274. The back button 274 may be used to display a person profile, conversation thread, or other information that was previously displayed in the viewing panel 264. For example, if the user was previously viewing a person profile for a person named Mark Wagner, clicking on the back button 274 may cause the viewing panel 264 to display the person profile for Mark Wagner. In another example, if the user was previously viewing information about an e-mail attachment, clicking on the back button 274 may cause the viewing panel 264 to display the previously viewed e-mail attachment information.

The navigation buttons 270 may also display a navigation history that has lead to the current information being displayed in the viewing panel 264. In the example shown in FIG. 2C, the navigation buttons 270 indicate that the user first viewed a person profile for Jen Ertel. The user then viewed a person profile for Jerri Clark Wagner. The user may have opened the person profile for Jerri Clark Wagner by clicking on the name Jerri Clark Wagner in a contact network or list of contacts on Jen Ertel's person profile, or by performing a search for Jerri Clark Wagner, or other information associated with Jerri Clark Wagner. The navigation buttons 270 indicate that the user then viewed a person profile for Mark Wagner. The user may have caused the current conversation thread 266 to be displayed by clicking on a conversation thread in a conversation list similar to the conversation list 224 from FIG. 2A. In some implementations, clicking on or selecting any of the buttons in the navigation history may cause the viewing panel 264 to display the person profile, conversation thread, communication, communication attachment, or other information associated with the selected navigation button 270.

The viewing panel 264 may include a title bar 276. The title bar 276 may include the type of information being displayed in the viewing panel, the subject, and other key information. When the information being displayed in the viewing panel 264 is a conversation thread 266, the title bar 276 may indicate that a conversation is being viewed, the title or subject line of the conversation thread, the number of communications involved in the conversation thread, the types of communications involved in the conversation thread, or the number of people involved in the conversation thread. In the example shown, the title bar 276 indicates that a conversation is being viewed, that the subject line of the communications in the conversation thread 266 is "dinner?", that there are 8 people involved in conversation thread 266, that 18 communications are included in the conversation thread 266, and that all 18 communications are e-mails.

The viewing panel 264 may include a summary of some or all of the communications 278 that make up the conversation thread 266. Information displayed as part of the summary for each communication 278 may include the sender of the communication 278, the recipients of the communication 278, the time or day that the communication 278 was sent or received, attachments to the communication 278, the first few lines or sentences of the communication 278, the importance of the communication 278, or the number of recipients of the communication 278. For example, an e-mail summary 280 indicates that the user sent an e-mail in response to an e-mail from Jerri 1 week ago and that 5 additional recipients were also listed on the e-mail. The e-mail summary 280 also displays the first lines of the e-mail sent to Jerri.

In some implementations, clicking on or selecting a communication summary in the conversation thread 266 may cause the related communication to be displayed. For example, clicking on the e-mail summary 280 may cause the e-mail sent from the user to Jerri to be displayed. In another example, selecting a communication summary in the conversation thread 266 may cause a person profile for the sender or one or more recipients of the related communication to be displayed. In another example, selecting a communication summary in the conversation thread 266 may cause one or more attachments or a list of attachments to the related communication to be displayed. In some implementations, selecting a communication summary in the conversation thread 266 may cause a communication addressed to the sender or one or more recipients of the related communication to be automatically generated. In some implementations, selecting a communication summary in the conversation thread 266 may cause a more detailed summary for the related communication to be displayed.

The viewing panel 264 may include a detail adjustment control 282. The detail adjustment control 282 may be used to modify the amount of detail that is displayed in each communication summary in the conversation list 266. In some implementations, adjusting the detail adjustment control 282 may increase or decrease the number of words or lines of a body of a communication that are displayed in each communication summary. In some implementations, adjusting the detail adjustment control 282 may increase or decrease the amount of information that is displayed for each communication summary. For example, the detail adjustment control may be changed to display an e-mail address and phone number for each sender or recipient of each communication 278 in the corresponding communication summary. In another example, the detail adjustment control 282 may be used to control what information is used to identify senders or recipients of communications 278 in each communication summary. Information used to identify senders or recipients may include names, nick names, screen names, e-mail addresses, telephone numbers, social network profile names, or company names.

In some implementations in which some or all of the communications that make up a conversation thread 266 are telephone calls or voice over IP communications, audio recordings of some or all of the telephone calls or voice over IP communications may be displayed in the conversation thread 266. Clicking on or selecting a telephone call or voice over IP communication in the conversation thread 266 may cause an audio recording of the communication to play. In some implementations, automatically or manually created transcripts of telephone calls or voice over IP communications that make up part or all of a conversation thread 266 may be displayed. In some implementations, a summary of a transcript of the audio communication may be displayed as part of a communication summary in the conversation thread 266. Clicking on or selecting a communication summary of a telephone call or voice over IP communication for which a transcript exists may cause the full transcript of the audio communication to be displayed, or an audio file of the audio communication to play.

The viewing panel 264 may include a conversation participants list 284. The conversation participants list 284 may be a list of senders and recipients of the communications 278 that make up the conversation thread 266. Information about each participant in the conversation thread 266 may be displayed, including name, contact information, number of communications initiated in the displayed conversation thread 266, and other relevant information. The conversation participants list 284 may also indicate the total number of participants involved in the conversation thread 266.

In some implementations, clicking on or selecting a person listed in the conversation participants list 284 may cause a person profile for the selected person to be displayed. In some implementations, selecting a person from the conversation participants list 284 may automatically generate a communication addressed to the selected person. In some implementations, selecting a person from the conversation participants list 284 may cause all communications or summaries of communications from the current conversation thread 266 that were initiated by the selected person to be displayed.

The viewing panel 264 may include a files exchanged list 286. The files exchanged list 286 may display a list of files that have been exchanged in the current conversation thread 266. For example, the files exchanged list 286 may list all of the files that have been attached to communications 278 in the conversation thread 266. Clicking on or selecting a file from the files exchanged list 286 may cause the selected file to open. In some implementations, selecting a file from the files exchanged list 286 may cause one or more communications to which the file was attached to be displayed. In some implementations, selecting a file from the files exchanged list 286 may cause one or more communication summaries for communications to which the file was attached to be displayed.

Figure 2D:
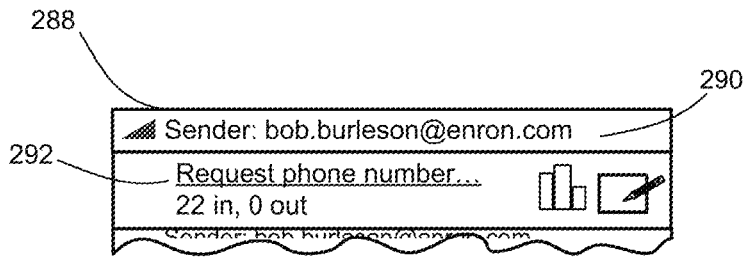
FIG. 2D shows a portion of an example person profile that may be used to request contact information.

FIG. 2D shows a portion 288 of a person profile that may be included in a person profile such as the person profile 230 in FIG. 2B. The portion 288 displays an e-mail address 290 for a person that has had communications with a user. The portion 288 also includes a request contact information link 292. When clicked or selected, the request contact information link 292 may cause a communication addressed to the person using a known piece of contact information to be automatically generated. This automatically generated communication will request additional contact information from the person. If the person responds to the automatically generated communication, the requested contact information may be extracted from the response and displayed as part of the person profile. The extracted contact information may also be used in future communications with the person. For example, if the instant message screen name of the person is known, but the e-mail address for the person in unknown, clicking on the request contact information link 292 may automatically generate an instant message addressed to the person's known screen name with a request for the person's e-mail address. When the person responds to the automatically generated instant message with his or her e-mail address, the e-mail address may be extracted from the instant message and displayed as part of the person profile.

In the example depicted in FIG. 2D, the e-mail address 290 for the person is known, however a phone number for the person is unknown. Clicking on the request contact information link 292 may cause an e-mail addressed to the e-mail address 290 to be automatically generated with the text "Hello, I don't have your phone number. May you please send it to me." If the person responds to the automatically generated e-mail with a phone number, the phone number may be extracted from the e-mail and displayed as part of the person profile.

In some implementations where the person responds with more than one additional piece of contact information, each additional piece of contact information may also be extracted and displayed as part of the person profile. For example, if an e-mail requesting a phone number from the person is automatically generated and sent, the person may send a response e-mail containing both a home phone number and work phone number. Both phone numbers may be extracted from the response e-mail and displayed with the work phone number and home phone number respectively indicated.

Figure 2E:
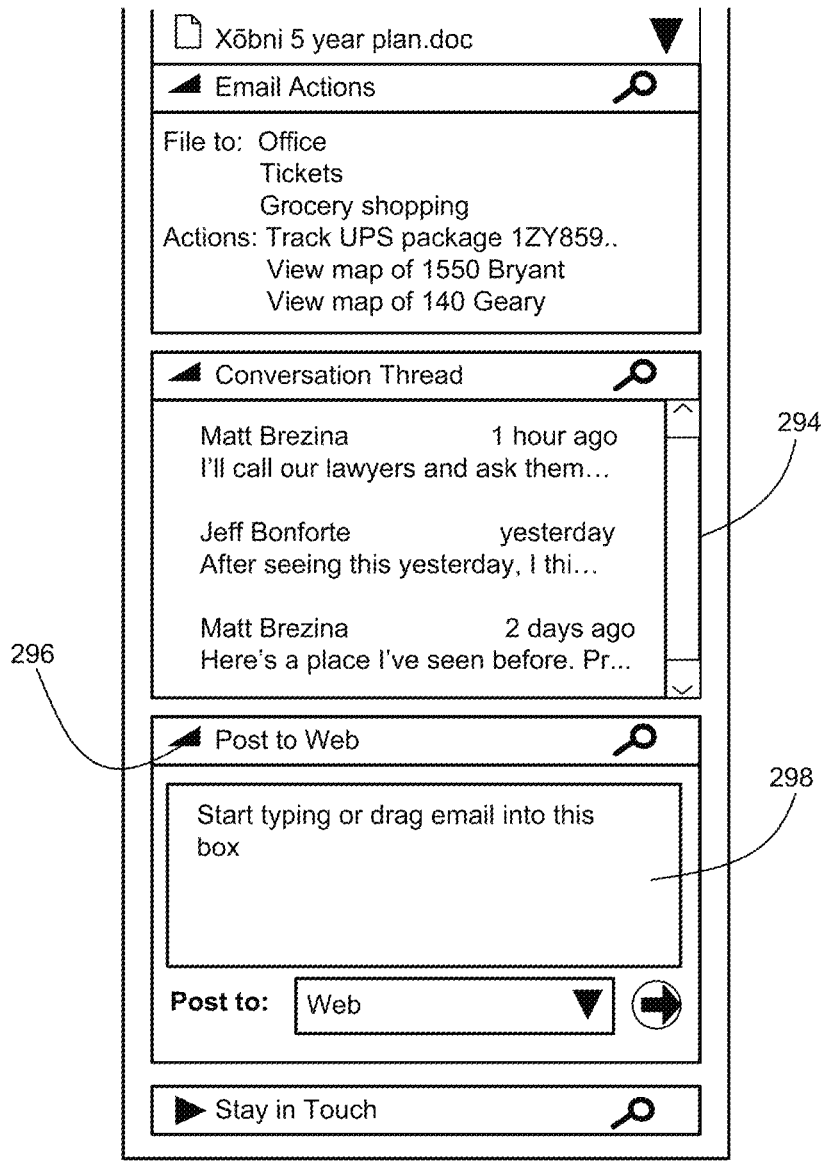
FIG. 2E shows a portion of an example person profile that may be used to post shared notes.

FIG. 2E shows a portion of a person profile 294. The person profile 294 includes a shared notes panel 296. The shared notes panel 296 may be used by a user to share information with other participants who have a relationship with the user or are known contacts of the user. Shared notes may take the form of text, documents, video files, audio files, images or hyperlinks. The user may designate which persons or contacts are permitted to view shared notes.

Posting a shared note may involve typing text or a hyperlink in a box 298 in the shared notes panel 296. One or more files may be added to the shared note by browsing for the files in a file directory and selecting the files to be attached to the shared note. In some implementations, one or more files may be added to the shared note by dragging the one or more files into the box 298. The one or more files dragged into the box 298 may include files in a folder on a computer or computer network, files that are attached to communications, files that are listed as part of a communication summary, or files that are listed in an exchanged files list.

Shared notes may be displayed as a part of a person profile and may be displayed chronologically or grouped by the type of shared note or other grouping criteria. For example, if a first person posts a shared note and a second person is on a list of contacts that are permitted to view shared notes posted by the first person, a person profile for the first person on a computer used by the second person may display the shared note from the first person as part of the person profile.

In some implementations, information shared in a shared note may be used to refine web searches. For example, a hyperlink may be sent as part of a shared note. This hyperlink may be included in a list of search results for a subject related to the topic of the shared note. Shared notes may also be used to profile a person or group of people and their interests by analyzing common sources of information and types of information commonly shared. This may be used to target adverting or recommend sources of information.

In some implementations, the shared notes panel 296 may be a panel, pop-up window, or pop-up bubble that is separate from the person profile 294. In some implementations, the shard notes panel 296 may be part of a conversation thread display. In some implementations, the shared notes panel 296 may be part of a viewing panel such as the viewing panel 264 of FIG. 2C. In some implementations, files that are shared using a shared notes system such as the one described may be stored and retrieved upon request, by for example, visiting the file location in a web browser, or when a user of the system views a person profile of a contact who shared the file.

Figure 3:
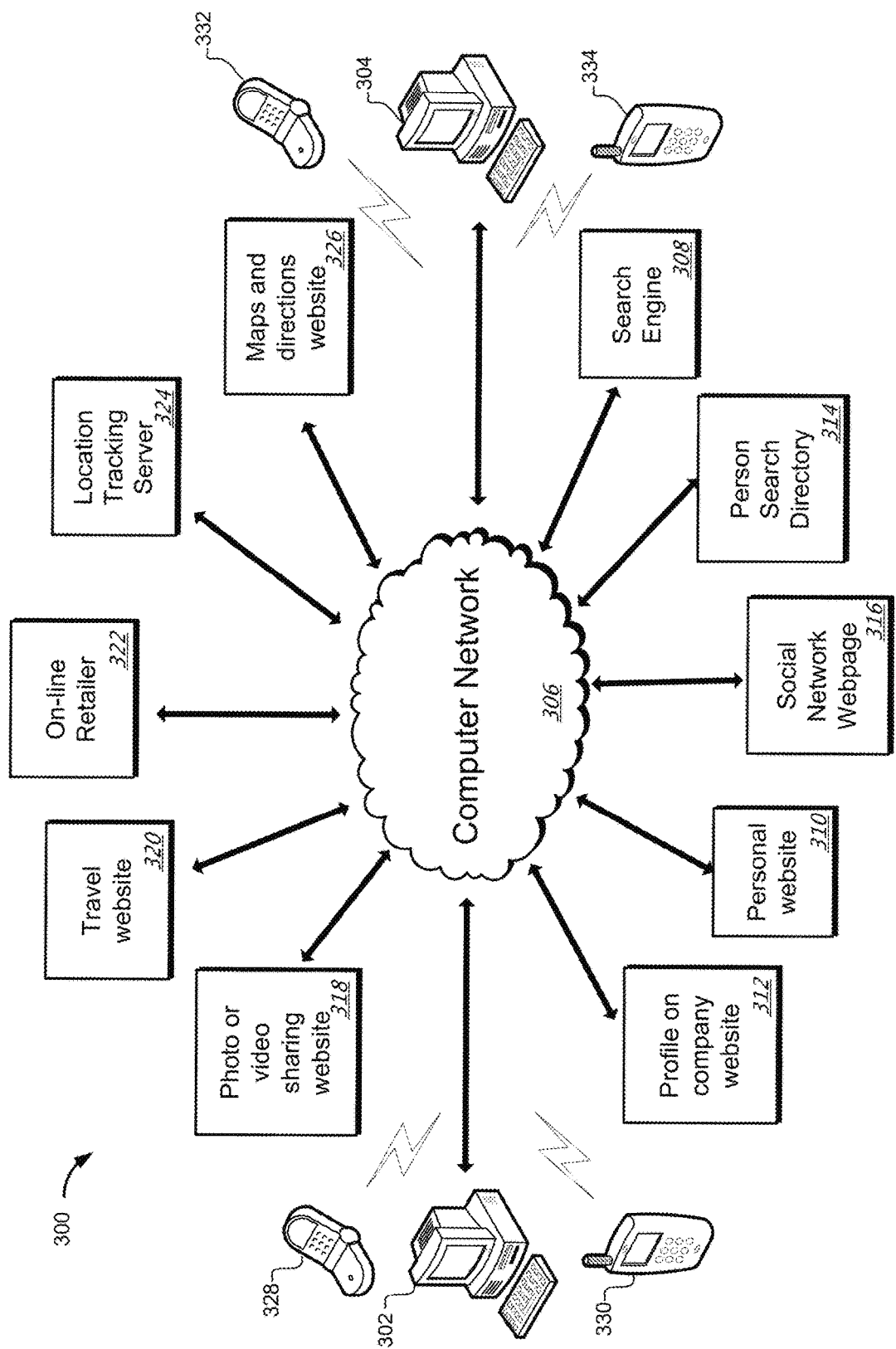
FIG. 3 shows an example communication delivery system.

FIG. 3 shows an example communication delivery system 300. In the system 300, a first device (e.g., computer 302 or wireless devices 328/330) belonging to a first user may transmit a communication to a second device (e.g., computer 304 or wireless devices 332/330) belonging to a second user over a computer network 306. The computer network 306 may be the Internet, an intranet, a LAN system or a company's internal computer network. In some implementations, the computer 302 and the computer 304 may be desktop computers, laptop computers, cell phones, web enabled televisions, or personal digital assistants. The communication transmitted from the computer 302 to the computer 304 may be an e-mail, phone call, instant message, text message, social network message or comment, message board post, or voice over IP communication.

The computer 304 may extract data from the communication about the first user. This data may be used to make a person profile similar to the person profile 230 shown in FIG. 2B. Data extracted from other communications with the first user may also be used to create a person profile for the first user. Data that is extracted from communications with the first user may be used to query websites, search engines, person search directories and other sources of information for additional information about the first user that may be used to create a person profile. Information from communications that may be used as search criteria include names, screen names, social network profile names, social network profile URLs, physical addresses, website URLs, e-mail addresses, or telephone numbers. Information that is collected as a result of these queries may be used in future searches to identify additional information that may be used to create a person profile.

For example, the computer 304 may receive an e-mail sent by the first user from the computer 302. The computer 304 may perform a search using a search engine 308 with the first user's e-mail address as the search criteria. The search engine 308 may return a search result that includes the first user's phone number. This phone number may be displayed as part of a person profile for the first user. The search engine 308 may also return the URL for or link to a personal website 310 belonging to the first user. The personal website 310 may contain additional information about the first user that may be used to create a person profile, such as additional contact information or biographical information.

In another example, the e-mail address belonging to the first user may include an extension for a company. The computer 304 may perform a search using the search engine 308 with the e-mail extension as the search criteria. A result returned by the search may be a company website. The company website may be searched to reveal a profile page 312 for the first user on the company website. The profile page 312 may contain additional information about the first user that may be used to create a person profile, such as additional contact information or biographical information.

In another example, the computer 304 may perform a search using a person search directory 314 with the first user's name or other contact information as the search criteria. The person search directory 314 may return search results with additional contact information and other information that may be used to create a person profile for the first user.

In another example, the computer 304 may receive an e-mail sent by the first user from the computer 302. The e-mail may contain a social network profile name for the first user. The computer 204 may extract this social network profile name from the e-mail and use it to access a social network webpage 316. The social network webpage 316 may contain additional contact information and other information that may be extracted and used to create a person profile for the first user. The social network webpage 316 may also contain additional contacts that may be associated with the first user in a person profile. For example, persons on the friends list of the social network webpage 316, or persons who have posted comments or messages on the social network webpage 316 may be listed as contacts in a contact network for the first user.

In another example, a search performed using the search engine 308 may return a URL or link for a photo or video sharing website 318 on which the first user has a profile. Additional contact information or biographical information that may be extracted and used to create a person profile for the first user. For example, a profile belonging to the first user on a video sharing website may include an instant message screen name for the first user. This screen name may be extracted and displayed as part of a person profile for the first user.

Information extracted from communications between the first user and second user may also be used to update profile information on a social network webpage or other webpage. For example, the computer 304 may detect that the second user system has primarily used e-mail address "david@foo.com" in recent communications, while the second user's profile on the social network webpage 316 shows his e-mail address as "david@bar.com". The computer 304 may share the second user's new e-mail address with the social network webpage 316 and the social network may automatically update the second user's info or suggest he update it based on this changed behavior recorded by the computer 304.

Information from travel websites and on-line retailers may also be extracted and displayed as part of a person profile. For example, an e-mail containing information about a flight itinerary may be received by the computer 304. The computer 304 may extract a flight number or other information about a flight from the e-mail. The computer 304 may then query a travel website 320 using the flight number or other flight information as search criteria. Information about the flight, such as expected departure time, expected arrival time, expected delays, weather in the destination city, weather in the departure city, or any changes to the flight may be displayed as part of a person profile.

In another example, an e-mail containing information about an item or service that the second user is interested in purchasing may be received by the computer 304. The computer 304 may query one or more search engines, websites, or on-line retailers 322 to determine which retailer or website has the best price or currently has the item in stock or the service available. This information may then be displayed as part of the person profile.

Information from mapping web sites and location tracking servers may also be extracted and displayed as part of a person profile. For example, the first user may own a GPS unit, cell phone, or other device that is capable of transmitting the first user's current physical location. A location tracking server 324 may receive this transmission and allow other users to access the first user's current location information. If the second user has permission to view the location information for the first user, the computer 304 may access the location tracking server using the computer network 306 to receive location information about the first user. This location information may be displayed as part of a person profile.

The computer 304 may also access a maps and directions website 326 to create a map of the first user's current location, or to generate directions to the first user's current location. The map or directions may be displayed as part of a person profile for the first user. The maps and directions website 326 may also be used to generate a map or directions to one or more known addresses for the first user, such as a work address or home address. The map or directions may be displayed as part of a person profile for the first user.

Figure 4:
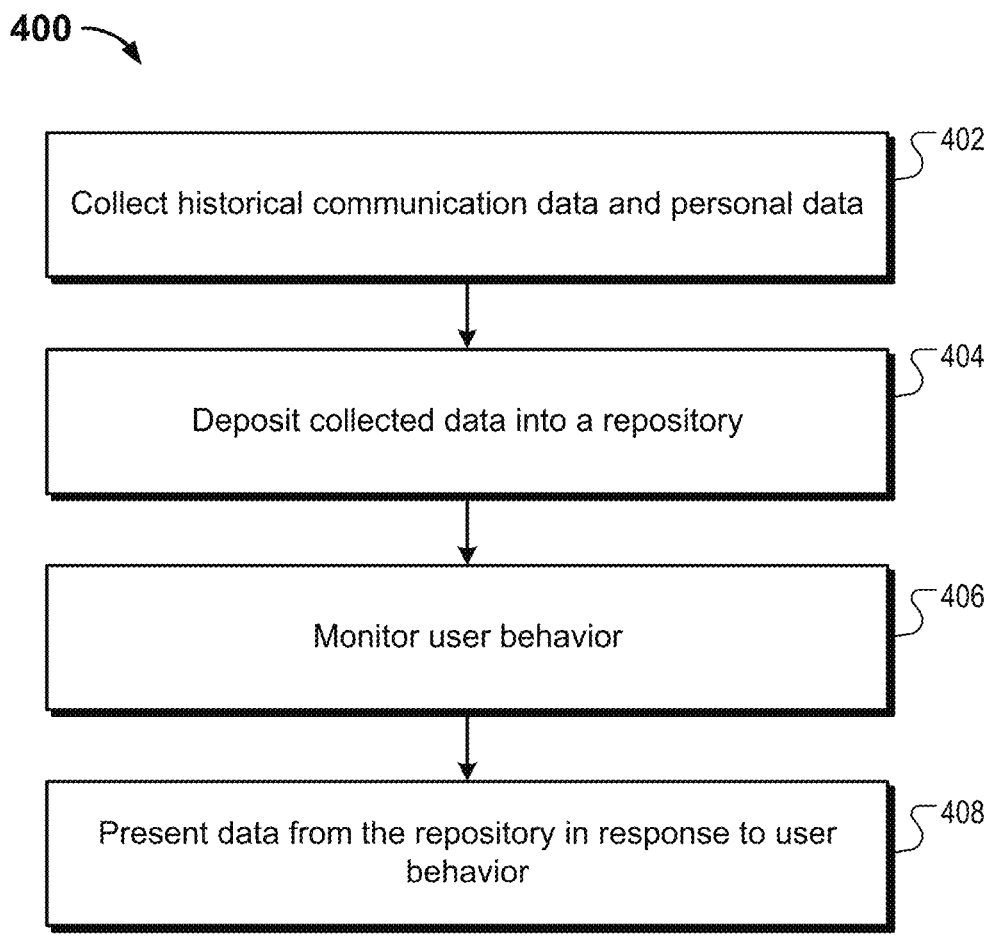
FIG. 4 is a flow diagram of an example process for collecting and presenting historical communication and personal data.

FIG. 4 is a flow diagram of an example process 400 for collecting and presenting historical communication and personal data. The process 400 may, for example, be implemented in a system such as the e-mail system of FIG. 1. In another example, the process 400 may be implemented in a system such as the communication delivery system 300 of FIG. 3.

Stage 402 collects historical communication data and personal data. For example, communications such as e-mails, instant messages, phone calls, text messages, internet message board postings, social network messages or comments, or voice over IP communications may be collected. Historical communication data and personal data may also be collected from web search engines, people search engines, social networks, e-mail clients, personal web pages, telephone directories, scanned business card data, picture sharing websites, video sharing websites, person profile pages, travel websites, on-line retailers, or customer relationship management systems.

The collected historical communication data and personal data may include contact information, biographical information, communication text, communication summaries, physical location information, mapping information, attachments to communications, weather information, travel information, and retail information.

Stage 404 deposits the collected data into a repository (e.g., stored as records in an address book (such as address book 50)). For example, the collected data may be stored in a database on a user's computer. The collected data may also be stored on a network server, a web server, a removable storage device, or as part of an e-mail client, other communication client or stand alone application (e.g., an address book application).

Stage 406 monitors user behavior. For example, a system implementing the method 400 may track the mouse movements, keyboard strokes, or mouse clicks of a user of the system, or active windows or mouse locations displayed on a monitor or other display device of the system. The user's behavior may be monitored to determine if a user has opened, viewed, read, or composed a communication, such as an e-mail. The user's behavior may also be monitored to determine if the user has performed a search, clicked on a particular item, or selected a particular item.

Stage 408 presents data from the repository in response to user behavior. For example, referring to FIG. 2A, the person profile 208 may be displayed in response to a user selecting the e-mail 210 in the inbox viewing panel 204. In another example, information about a person may be displayed in response to a user performing a search for the person's name. In another example, information about a file may be displayed in response to a user clicking on the file in an e-mail or other communication. In another example, information about a topic may be displayed in response to a user clicking on or selecting text within the body of a communication.

Address Book Detail

Figure 5:
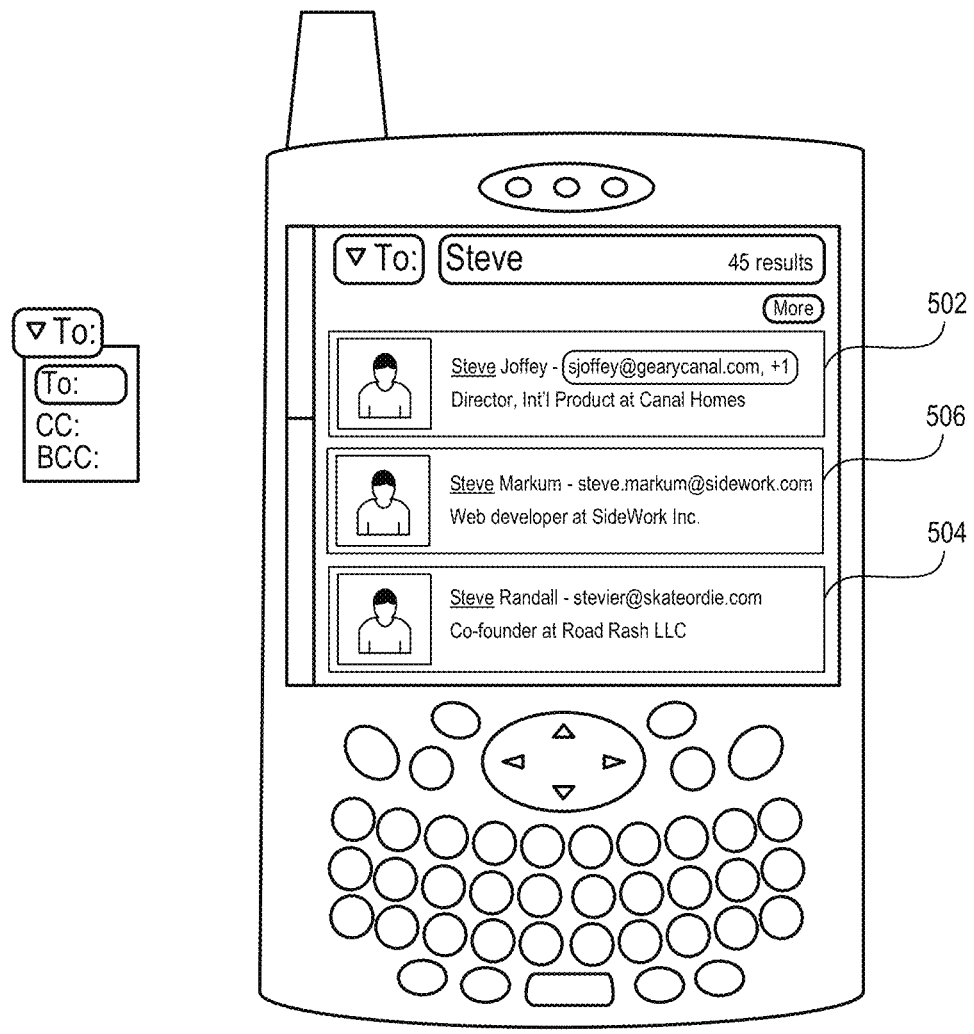
FIG. 5 shows an example of an address book.
Figure 6A:
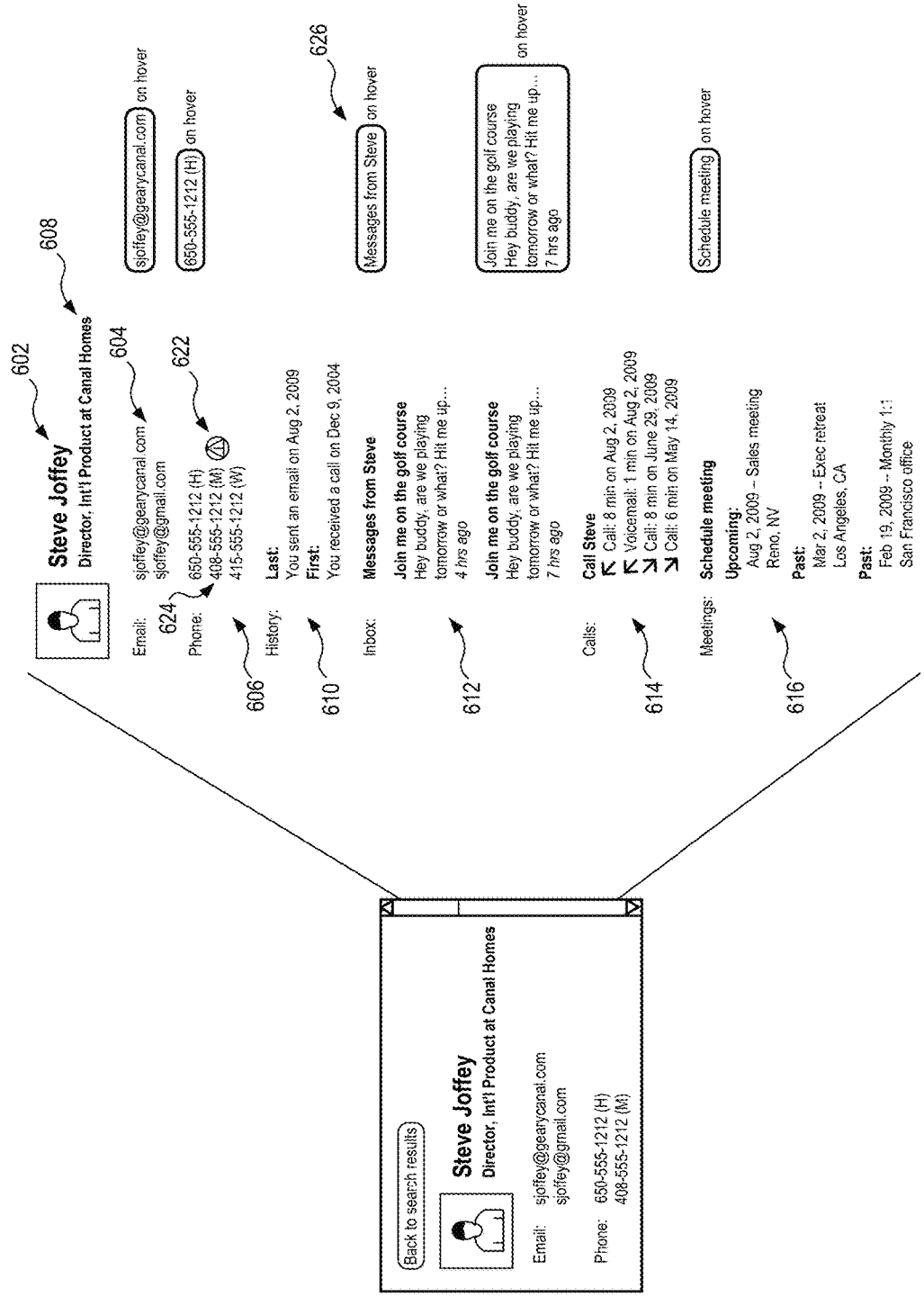
FIG. 6A shows an example of contact information of a contact in the address book shown in FIG. 5
Figure 6B:
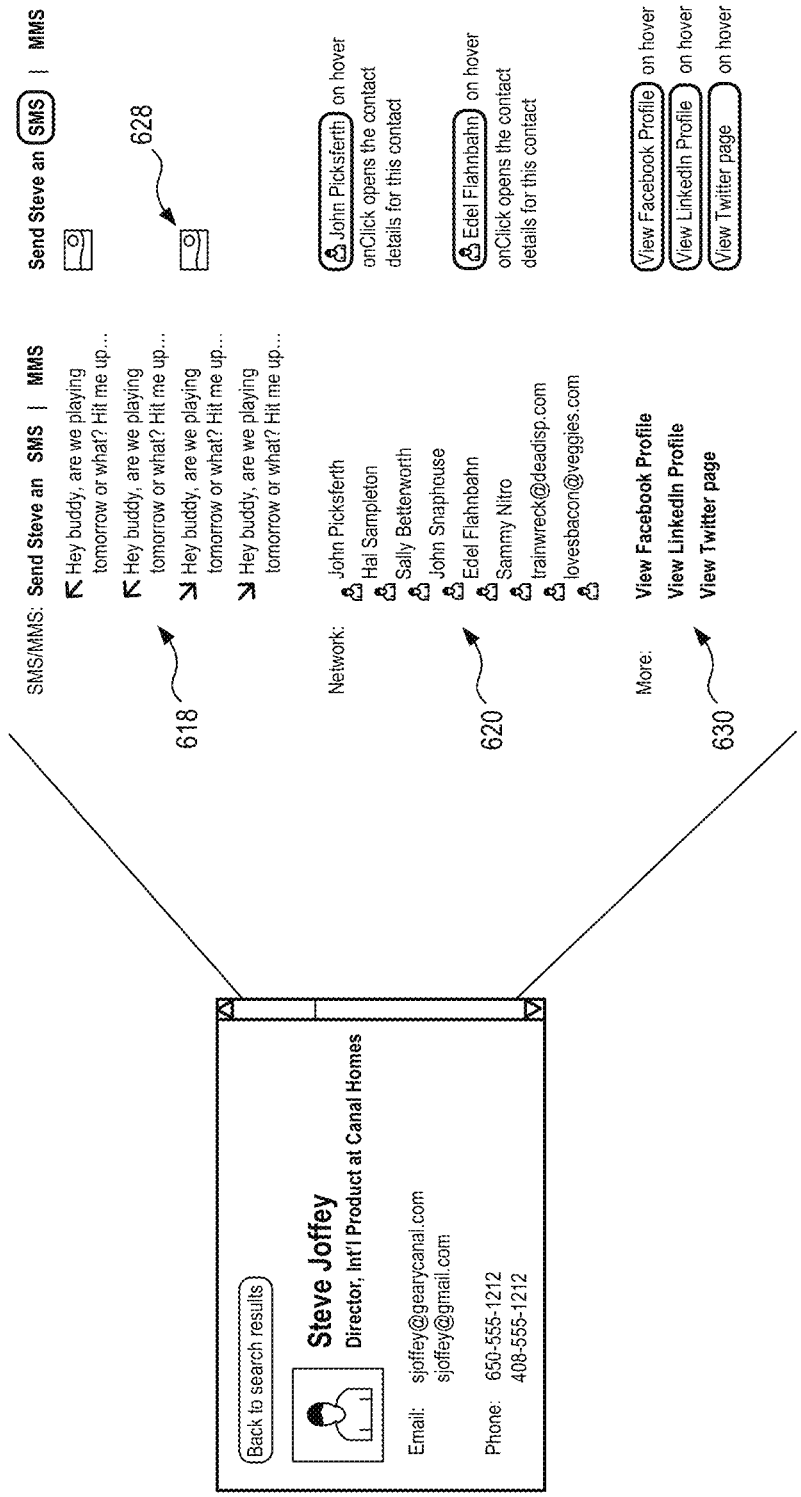
FIG. 6B shows an example of additional contact information of a contact in the address book shown in FIG. 5

Referring to FIGS. 5, 6A and 6B, the address book 50 may be presented as a user interface (e.g., facilitated by the presentation routine 54-1) that includes one or more entries (e.g., entries 502-506) with each entry containing contact information associated with a contact such as name 602, e-mail address (e.g., business and personal) 604, phone number 606, job title 608, message histories 610 with the contact, e-mail history 612 associated with the contact, usage history 614 (e.g., date and time) indicating prior calls from the contact, information 616 indicating past, present and future events involving the contact (e.g., meetings with the contact), SMS/MMS messages 618 with the contact, contacts 620 who are part of the contact's network, and social network profile URLs 630. Although not shown, other information such as screen names (e.g., instant messenger screen names), personal web site URLs, physical address and the like also may be included.

The address book 50 also may be supplemented with additional information (e.g., as facilitated by the record data routine 54-2). For example, as shown in FIG. 6A, the indicator 622, when clicked, may populate a window that displays a snippet of the communication (e.g., an e-mail snippet) from which the mobile phone number 624 is extracted. As another example, when the user hovers a pointer over the indicator 626, a window may be populated that displays a full or partial communication of the original source with which the corresponding e-mail message is cross referenced. As yet another example, referring to FIG. 6B, the indicator 628, when clicked by the user, may open an image file that is attached to the corresponding SMS message.

In some implementations, the user may change an address book entry, delete an existing address book entry, or add a new address book entry. As will be discussed in greater detail below, in some implementations, the user may share (e.g., facilitated by the sharing routine 54-3) the address book 50 with one or more contacts selected by the user. The address book 50 also may be shared with public/private users/groups, companies and organizations associated with the user. The user may designate a specific contact or group(s) of contacts with different levels of access to the address book 50 (e.g., the selected contact or group of contacts may have access to modify the address book 50, access to view the address book 50, access to receive the address book 50 or address book updates, and access to request the address book 50 or address book updates be sent to another contact). As an example, the user may designate the address book 50 as a personal address book, and limit the address book 50 access to just the user (e.g., not shareable). Alternatively, the user may select a group of contacts, and share the address book 50 only with the selected group of contacts (e.g., made accessible only to the contacts in the selected group).

The address book 50 may be implemented in volatile memory (e.g., RAM) or non-volatile memory (e.g., Flash Memory) of a computing system (e.g., a personal PC) or a wireless device (e.g., iPhone®, Blackberry®, Treo®, etc.), in an element external to the computing system or wireless device through a network (e.g., a server or host PC), or a combination of some or all of these elements. The address book 50 may be used in conjunction with other software applications such as, without limitations, an information manager, a personal organizer, a personal calendar, a personal wiki, or any other source of contact information.

In some implementations, before the user may modify the address book 50, the user's identity may be authenticated in advance, including, for example, requesting a password from the user, identifying device information of the device hosting the address book 50. After authenticating the user, modifications to the address book 50 may be accepted. Where the address book 50 resides on an external host, the user may allow a specific contact or a limited number of contacts to update or modify the address book 50 remotely (e.g., a spouse of the user, or system administrator managing the external host hosting the address book 50) through the network 306. Otherwise, access to the address book 50 may be denied. For example, during operation, when the user may access the address book 50, and an external application (e.g., the e-mail client 102) may verify whether the user has access to the address book 50. Once the user is authenticated, the external application may update and store the contact information as modified by the user locally at the user's computing system. Alternatively, the update may be transmitted over the network 306 to the external host. In other implementations, the user's identity need not be authenticated.

The address book 50 may be updated (e.g., by crawling various web pages associated with the existing contacts) at any user-defined time such as, for example, on a periodic basis, at a request, or after modifications to the address book 50. Update may be instantaneous, and may be communicated to users or contacts who also possess a copy of the user's address book 50 (e.g., through sharing). The users also may update the address book 50, and send the updates back to the owner of the address book 50.

In some implementations, the external host also may synchronize contact information with the computing system (e.g., computers 302/304) hosting the address book 50. If the computing system is unable to receive information (e.g., the computing system is turned off, not activated, or outside the service range of a wireless network), the update may be delayed or canceled. If the update is delayed, the update may be re-transmitted at a later user-defined time (e.g., on a periodic basis or when the wireless device is detected as being capable of receiving information). Update to the address book 50 also may be saved or imported into any Internet-compatible e-mail application such as Microsoft Outlook®, Netscape® Messenger, or Qualcomm's Eudora®.

The address book 50 may store contact information and message information associated with one or more contacts as described above. Message information may include application-specific and format-specific information about past communications between the user and the one or more contacts. Application-specific information may include any information identifying the application used to send or receive a past communication (e.g., via e-mail or text). Similarly, format-specific information may include any information identifying the format in which a past communication was sent or received (e.g., a past e-mail message was received with specific Multipurpose Internet Mail Extensions (MIME) information attached).

The address book 50 may be implemented on a computing system (e.g., computers 202/204 shown in FIG. 2), on a wireless device, on a system external to the wireless device (e.g., an external host or server) via the network, or a combination thereof.

The address book 50 may include a contact information database (e.g., storing information associated with a given contact), system information database (e.g., storing information associated with the system or device used to communicate with a given contact); application specific information database (e.g., storing information associated with an application (e.g., e-mail or text) used to communicate with a given contact); and external source information database (e.g., storing information associated with outside sources through which contact information may be updated or obtained).

Ranking Contacts

In some instances, the user may send an e-mail message to a particular contact who is related to the user (e.g., a friend, a co-worker, a family member, etc.). In the address field of the e-mail message, the user may enter the name of the contact (e.g., "Eric"). A conventional address book generally matches the contact name "Eric" with the appropriate contact stored in the address book. In a company or organization with only one user named "Eric", entering "Eric" in the address field is unambiguous to the e-mail system used to send the e-mail message, and the address book may readily match the name "Eric" to the correct e-mail address. However, where the company or organization has multiple employees named "Eric", the name of the recipient must be resolved to the correct "Eric". To do so, the user may scroll through the address book and manually locate the correct "Eric". This manual process, however, is inconvenient, particularly where the address book may contain thousands of names (e.g., in large companies and organizations), which may increase the chances for ambiguity. The potential for false matches also may increase as the address book continues to grow.

In some implementations, the address book 50 may use information stored in the databases to rank the contacts, and subsequently generate a list of proposed recipients for the user based on the contact's respective rank. The list of proposed recipients, which may be generated based on different weights assigned to each contact (or one or more entry fields as such name 602, usage history 610, e-mail history 612, etc.) may reduce the time needed for the user to locate an appropriate contact in the address book 50. In some implementations, the contacts in the address book 50 may be prioritized and ranked based on information collected from prior communications between the user and the contacts. A list of proposed recipients may subsequently be generated based on the ranking.

In some implementations, different lists may be generated for different communication formats, as will be discussed in greater detail below. For example, one list of proposed recipients (e.g., a list of contacts that includes contact "A", contact "B" and contact "C") may be generated when the user selects e-mail as the communication format, and a different list of proposed recipients (e.g., a list of contacts that includes contact "D", contact "E" and contact "A") may be generated when the user selects instant messaging as the communication format.

In some implementations, the address book 50 also may utilize message and contact history associated with the contacts to rank the contacts. As an example, the address book 50 may retrieve and analyze all e-mail messages in the e-mail history 612 (e.g., being stored in the contact information database). The address book 50 also may analyze message and contact history such as, without limitation: (1) a total number of e-mail messages received by the user from a particular contact (e.g., a total of 100 messages to the user were received from contact "A"); (2) the time and date or time intervals at which a particular e-mail was received (e.g., 100 e-mail messages were received from contact "A" within the past 10 days); (3) one or more keywords or search terms associated with a particular e-mail message (e.g., one message from contact "A" may contain the keywords "introduced by", "president", "conference", etc.); (4) information indicating a relationship between a particular e-mail message from a particular contact and another e-mail message from another contact (e.g., the purchase order e-mail sent by contact "A" is related to the shipping confirmation e-mail sent by contact "B" who is the business partner of the user); (5) information indicating an event or place associated with a particular e-mail message (e.g., contact "A" was introduced to the user during a technical conference held in January by contact "B"); (6) a relationship timeline (e.g., last contacted, first contacted, introduced by, etc.) associated with a particular contact (e.g., contact "A" was first contacted on Jan. 1, 2009 about a potential business deal, last contacted on Jun. 1, 2009 to discuss payment and shipping, and a future contact has been scheduled on Sep. 1, 2009 to follow up on the business deal); and event-driven information (e.g., the user had five business meetings with contact "A" while the user was visiting contact "A").

After analyzing the message information, the address book 50 may utilize the results to differentiate between the contacts such that a comparative analysis between the contacts may be performed to produce various weights that may be used to generate a list of proposed recipients. For example, the address book 50 may generate a list of top contacts (e.g., top ten contacts) based on one or more weights assigned to those contacts. The proposed list may be ranked based on the same weight(s) or according to some other criteria. For example, weight may be assigned to contacts based on the date of the most recent contact. As an example, if the most recent contact with contact "A" is Jan. 1, 2009 and the most recent contact with contact "B" is Jan. 1, 2001, then contact "A" may be assigned with a higher weight than contact "B". As another example, priority may be given to contact "A" when the user selects to send an e-mail where all prior communications from contact "B" are via SMS messages. Other types of weights also are contemplated, including, without limitation, weights based on keyword analysis (e.g., contact "A" may be ranked higher than contact "B" when the user composes a message about "business" in which more messages with contact "A" contain the term "business" than those with contact "B"), and weights based on the direction of communication, such as that a contact sends communications to the user more frequently than other contacts, or that the contact receives communications from the user more frequently than other contacts (e.g., contact "A" may be ranked higher than contact "B" if more messages are composed and sent to contact "A" than to contact "B"). Other types of weights may also include weights based on multimedia content preferences. As an example, if prior communications with contact "A" mostly involve pictures, then the address book 50 may propose contact "A" as the first entry in a list of proposed recipients when the user seeks to forward an image file.

In some implementations, each contact may be assigned with one or more weights. The weights assigned may be the same or different for each user. For example, the rank of contact "A" may be based on the recency of communications and the quantity of messages exchanged between the user and contact "A", while the rank of contact "B" may be based on the relationship of the user and contact "B" as well as the number of times the keyword "business" appears in the communications exchanged between the user and contact "B" with respect to other contacts. In other implementations, all users may be ranked based on the same weight or weights.

As discussed above, the address book 50 may be used with multiple communications applications, such as, without limitations, e-mail and phone, and the list of proposed recipients may also depend upon the form of communication selected for sending a current message. In some cases, the user may favor one form of communication more than another for a particular contact. Similarly, the user may favor one contact more than another for a particular form of communication. For example, the user may prefer sending text messages to a spouse, but prefer sending e-mail messages, instead of text messages, to co-workers. In some implementations, ranking based on weights may consider the communication format currently selected by the user. The address book 50 may learn information about the user's past communications with particular contacts and the respective form of communication(s) used to send those communications, and employ these information to help develop the proposed list of recipients. For example, if the user has generated an audio recording and provided an input indicating a desire to attach the recording to an e-mail message, the address book 50 may display a selectable list of contacts with whom the user has most recently (or frequently) sent audio files. Thus, by way of example, if the user prefers to send videos to his spouse, audio recordings to his friends and pictures to his co-workers, then the address book 50 may analyze the application specific information database to generate a proposed contact list that may list the assistant first whenever the user composes an e-mail message that includes an audio file, a proposed contact list that may list the spouse first whenever the user composes an e-mail message that includes a video file, and a proposed contact list that may list a co-worker first whenever the user composes an e-mail message that includes a picture. Furthermore, in the foregoing example, each list may display a different ordering between the spouse, the assistant and the co-worker. However, the user's business client contact information may not be listed at all if the user never sends multimedia messages to the business client.

In general, the proposed list of recipients generated by the address book 50 may be a function of the communications format and the types and quantity of information stored about past communications. In some implementations, the proposed list of recipients may be pre-configured by the user (as opposed to being generated based on weights), such as by establishing a personal list that indicates that certain contacts are to be included in any proposed list of recipients, or alternatively, be given a certain level of priority or weight when the proposed list is generated.

In operation, a user interface may be presented to the user with various options to delete, store or forward a particular file to a contact in the address book 50 through e-mail. If the user chooses to forward the file, the user interface may then display a compose screen with the file attached, and a list of proposed contacts/recipients based on the most recently used contacts to whom the user has sent a file of a similar type. Alternatively, an empty address field may appear, and the user interface may await input from the user before displaying contacts who begin with an input character, listed in, for example, most recently contacted order and whom the user has recently exchanged a document or file.

In sum, the address book 50 may generate a proposed list of recipients by alphabetical ordering, or may generate a proposed list where the ordering may be determined by weights assigned to the contacts. Weights may include, without limitations, weight by recency of communication; weight by frequency of communication; weight by the quantity of past communications; weight by relationship strength; weight by statistical analysis of the length of past messages; weight by statistical analysis of keywords in past messages; weight by statistical analysis of past exchanges of multimedia content; weight by statistical analysis of the duration of past communications sessions (e.g., telephone calls or chat sessions); weight by thread relationship (whether a message is a simple reply, or a reply to a reply, etc.); weight by font characteristics of past messages (e.g., a given contact may always write in blue fonts); or any other technique according to which contacts with whom the user has exchanged communications of a given format may be differentiated from one another. In general, one or more weights may be applied in ranking the contacts. Additionally, each weight may be given a different priority.

In some implementations, device-specific information may be stored in the system information database (e.g., in database 52), and used as a basis for generating the proposed contact list. For example, where the address book 50 is hosted on a wireless device and the wireless device is integrated with a global position service (GPS) system, positioning information may be included in the address book 50 that indicates the locations from which the past communications were sent (e.g., coordinates, countries, states, cities, towns, etc.). In these implementations, the proposed list of recipients may look different when the user is in San Francisco than when the user is in Boston. The proposed list of recipients also may vary within a small geographical area, such that the proposed list of recipients may differ during the course of a cab ride from one end of a city to the other.

Location information also may be obtained from a network (e.g., network 306) with which a wireless device hosting (or communicating with) the address book 50 is communicating. For example, location information may be determined based on protocol-specific information, call signaling information, past handshake information or any other means of determining the location where the user sent or received a past communication. For example, location information may be obtained from routing information (e.g., IP address) provided by the network, which may in turn acquire location information from mapping services or websites that may identify location or position coordinates of a contact based on routing information.

Shareable Address Book

The address book 50, in some implementations, may be shared between users and a contact or selected group of contacts. Sharing the address book 50 with other users and contacts may help improve the accuracy of the data and contact profiles stored in the address book 50, as the information in the address book 50 may be accessible to more users that may identify and correct erroneous information contained in the address book 50. In some implementations, the address book 50 may allow the owner to set sharing privileges to share the address book 50 with one or more contacts (or users), and to define the type of permission (e.g., read only, read and write only, no access, etc.) associated with the selected contact(s).

In some implementations, the user may select only a subset of the existing contacts with whom the address book 50 is to be shared. To generate a desired subset of contacts, the user may perform a search among the existing contacts who satisfy one or more search criteria. Search criteria may include names, screen names, social network profile names, social network profile URLs, physical addresses, website URLs, e-mail addresses, e-mail subject lines, file names, telephone numbers, keywords and the like. For example, a search using the search string "Xobni" may result in fifty contacts who have personal or business relationships with the company "Xobni". The user further may narrow the search results by performing another search within the results. For example, the user may perform a second search using the search string "business" that may result in five contacts with whom the user has business deals. The user may share the address book 50 with only this subset of contacts.

As another example, a subset of contacts may be generated by performing a "relation" search using the name "Jeff Bonforte". The result may return not only "Jeff Bonforte", but also any contact that bears a relationship (e.g., family relationship, business relationship and the like) with "Jeff Bonforte". The user may again perform an "event" search among the results using the search string "UCLA", and the final result may restrict to contacts whom the user knows while attending UCLA. Contacts resulting from both searches may then be used as a subset of contacts with whom the address book 50 may be shared.

Figure 7:
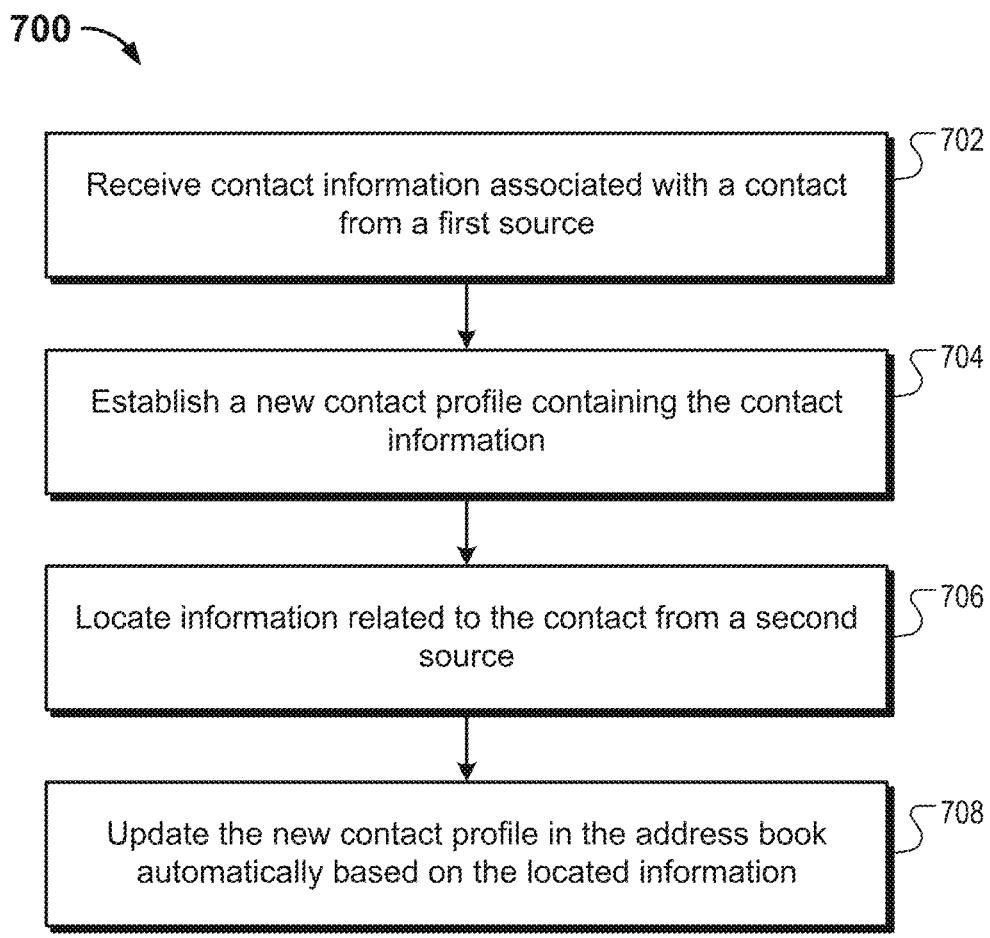
FIG. 7 is a flow chart showing an example of a process for updating a contact profile.

FIG. 7 is a flow chart showing an example of a process 700 for updating a contact profile. The process 700 may be performed, for example, by the address book 50 or application including the address book 50, and for clarity of presentation, the description that follows uses the address book 50 as the basis of examples for describing the process 700. However, another system/device, or combination of systems/devices, may be used to perform the process 700.

As shown in FIG. 7, process 700 beings with receiving contact information associated with a contact from a first source (702). A new contact profile containing the contact information may be established in an address book (704). Information related to the contact from a second source may be located (706). The new contact profile in the address book may be updated automatically based on the located information (708).

In some implementations, operations 702-708 may be performed in the order listed, or in parallel (e.g., by the same or a different process, substantially or otherwise non-serially). Also, the order in which the operations are performed may depend, at least in part, on what entity performs the method. Operations 702-708 also may be performed by the same or different entities or systems.

While the present invention is disclosed by reference to the preferred embodiments and examples detailed above, it is understood that these examples are intended in an illustrative rather than in a limiting sense. Numerous variations will be apparent to the reader.

Where appropriate, the systems, routines, methods and the functional operations described in this specification may be implemented in digital electronic circuitry, or in computer software, firmware, or hardware, including the structural means disclosed in this specification and structural equivalents thereof, or in combinations of them. The techniques may be implemented as one or more computer program products, i.e., one or more modules of computer program instructions encoded on a tangible program carrier for execution by, or to control the operation of, data processing apparatus. The tangible program carrier may be a computer readable medium. The computer readable medium may be a machine-readable storage device, a machine-readable storage substrate, a memory device, a composition of matter effecting a machine-readable propagated signal, or a combination of one or more of them.

A computer program (also known as a program, software, software application, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file. A program may be stored in a portion of a file that holds other programs or data, in a single file dedicated to the program in question, or in multiple coordinated files (e.g., files that store one or more modules, sub programs, or portions of code). A computer program may be deployed to be executed on one computer or on multiple computers at one site or distributed across multiple sites and interconnected by a communication network.

The routines, methods, processes and logic flows described in this specification may be performed by one or more programmable processors executing one or more computer programs to perform the described functions by operating on input data and generating output. The processes and logic flows may also be performed by, and apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, the processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, aspects of the described techniques may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

While this specification contains many specifics, these should not be construed as limitations on the scope of any invention or of what may be claimed, but rather as descriptions of features that may be specific to particular implementations of particular inventions. Certain features that are described in this specification in the context of separate implementations may also be implemented in combination in a single embodiment. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A method, comprising:
    in response to receiving communications sent to a user by senders including a first sender:
        creating, by a computing device, person profiles of the senders using information extracted from the received communications sent to the user by the senders if the person profiles do not exist, creation of a person profile being triggered in response to receiving a communication to the user from a sender without a person profile;
        updating, by the computing device, person profiles of the senders using information extracted from the received communications sent to the user by the senders if the person profiles do exist;
        querying, using the information extracted from the received communications sent to the user by the senders, at least one social network to extract information about the senders; and
        updating the person profiles using the information about the senders extracted by querying the at least one social network using the information extracted from the received communications sent to the user by the senders;
    identifying, based on a search, first profiles that satisfy a keyword search criterion, the first profiles including the profile of the first sender, and satisfaction of the keyword search criterion comprising a match to at least a portion of the information extracted from the at least one social network and at least a portion of the information extracted from the communications; and
    ranking the first profiles identified by the search.

2. The method of claim 1, wherein the information extracted from the communications is extracted from bodies of the communications.

3. The method of claim 1, further comprising selecting a subset of the person profiles, and sending the subset to the first sender.

4. The method of claim 1, further comprising automatically sharing the first profiles with a trusted network.

5. The method of claim 4, wherein each of the first profiles comprises a link.

6. The method of claim 1, further comprising receiving a read/write permission for each of the person profiles, and automatically sharing the first profiles based on the read/write permission for each of the first profiles.

7. The method of claim 1, further comprising ranking the person profiles, the ranking for each respective profile based on the information extracted from the at least one social network for the respective profile.

8. A non-transitory computer-readable medium storing computer-readable instructions, which when executed, cause a computing system to:
    store an address book comprising person profiles of senders of communications to a user, the person profiles including a profile of a first sender;
    in response to receiving the communications sent to the user by the senders:
        create, by at least one processor, the person profiles for the senders using information extracted from the received communications sent to the user by the senders if the person profiles do not exist, creation of a person profile being triggered in response to receiving a communication to the user from a sender without a person profile;
        update, by at least one processor, the person profiles for the senders using information extracted from the received communications sent to the user by the senders if the person profiles do exist;
        query, using the information extracted from the received communications sent to the user by the senders, at least one social network to extract information about the senders; and
        update the person profiles using the information about the senders extracted by querying the at least one social network using the information extracted from the received communications sent to the user by the senders;
    select a subset of the person profiles to be shared, the selection based on a search to identify profiles that satisfy a search criterion, the identified profiles including the profile of the first sender, and satisfaction of the search criterion comprising a match to at least a portion of the information extracted from the at least one social network and at least a portion of the information extracted from the communications;
    rank the subset identified by the search; and
    share the subset with a trusted network comprising the first sender.

9. The computer-readable medium of claim 8, wherein each of the person profiles comprises a link.

10. The computer-readable medium of claim 8, wherein the information extracted from the communications is extracted from bodies of the communications.

11. The computer-readable medium of claim 8, wherein the computer-readable instructions further cause the computing system to receive a read/write permission for each of the person profiles, and share the identified profiles based on the respective read/write permission for each of the identified profiles.

12. The computer-readable medium of claim 8, wherein the computer-readable instructions further cause the computing system to rank the person profiles, the ranking for each respective profile based on the information extracted from the at least one social network for the respective profile.

13. A system, comprising:
   memory storing an address book comprising a plurality of person profiles for senders of communications;
   a display device configured to display a person profile from the address book;
   at least one processor; and
   memory storing instructions configured to instruct the at least one processor to:
      in response to receiving the communications from the senders, extract information from the communications;
      query, using the information extracted from the received communications sent to the users by the senders, at least one social network to extract first information from the at least one social network;
      create the person profiles using the first information extracted by querying the at least one social network using the information extracted from the received communications sent to the user by the senders if the person profiles do not exist, creation of a person profile being triggered in response to receiving a communication to the user from a sender without a person profile;
      update the person profiles using the first information extracted by querying the at least one social network using the information extracted from the received communications sent to the user by the senders if the person profiles do exist;
      identify, based on a search, first profiles that satisfy a search criterion, wherein satisfaction of the search criterion comprises a match to at least a portion of the first information and at least a portion of the information extracted from the communications;
      rank the first profiles identified by the search; and
      display, via the display device, the first profiles.

14. The system of claim 13, wherein the information extracted from the communications is extracted from bodies of the communications.

15. The system of claim 13, wherein the instructions are further configured to instruct the at least one processor to receive a respective permission for each of the person profiles, and share the first person profile based on the respective permission.

16. The system of claim 13, wherein the instructions are further configured to instruct the at least one processor to rank the person profiles based on the first information.

17. The system of claim 16, wherein each of the person profiles comprises a link.

\* \* \* \* \*